United States Patent
Ramachandran et al.

(10) Patent No.: US 11,455,215 B2
(45) Date of Patent: Sep. 27, 2022

(54) CONTEXT-BASED DISASTER RECOVERY

(71) Applicant: Nutanix, Inc., San Jose, CA (US)

(72) Inventors: Parthasarathy Ramachandran, Palo Alto, CA (US); Binny Sher Gill, San Jose, CA (US); Naveen Kumar, Bangalore (IN); Karthik Chandrasekaran, Bangalore (IN)

(73) Assignee: Nutanix Inc., San Jose, CA (US)

( * ) Notice: Subject to any disclaimer, the term of this patent is extended or adjusted under 35 U.S.C. 154(b) by 89 days.

(21) Appl. No.: 16/398,250

(22) Filed: Apr. 29, 2019

(65) Prior Publication Data

US 2019/0370121 A1    Dec. 5, 2019

Related U.S. Application Data

(60) Provisional application No. 62/664,927, filed on Apr. 30, 2018.

(51) Int. Cl.
*G06F 11/14*    (2006.01)
*G06F 11/20*    (2006.01)
*G06F 9/455*    (2018.01)

(52) U.S. Cl.
CPC ...... *G06F 11/1464* (2013.01); *G06F 11/1451* (2013.01); *G06F 11/1469* (2013.01);
(Continued)

(58) Field of Classification Search
CPC ............. G06F 11/1464; G06F 11/1469; G06F 11/203; G06F 9/45558; G06F 2009/4557;
(Continued)

(56) References Cited

U.S. PATENT DOCUMENTS 8,549,518 B1    10/2013  Aron et al.
8,601,473 B1    12/2013  Aron et al.
(Continued)

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).
(Continued)

*Primary Examiner* — Bryce P Bonzo
*Assistant Examiner* — Albert Li
(74) *Attorney, Agent, or Firm* — Vista IP Law Group, LLP

(57) ABSTRACT

Systems and methods for unified application-level backup and restore using heterogeneous cloud-based backup service providers. An application programming interface is configured to process both data level replication operations as well as application-level operations that are executed to carry out high-level commands between a virtualized computing environment and any one or more of the heterogeneous cloud-based backup service providers. The API receives commands from applications in the virtualized computing environment. The API processes commands from the applications so as to facilitate replication of data to selected one or more cloud-based backup service providers. The commands perform data level replication operations as well as application-level operations for storing content to the cloud-based service provider. After a failure event and/or upon receipt of a restore command, the API initiates application-level operations that restore the application and its constituent entities. The data state is restored by the API using data level restore operations.

24 Claims, 12 Drawing Sheets

(52) U.S. Cl.
CPC .... *G06F 11/203* (2013.01); *G06F 2009/4557* (2013.01); *G06F 2009/45575* (2013.01); *G06F 2009/45591* (2013.01); *G06F 2201/815* (2013.01)

(58) Field of Classification Search
CPC . G06F 2009/45591; G06F 2009/45575; G06F 11/1446; G06F 11/1448; G06F 11/1451; G06F 11/1458
See application file for complete search history.

(56) References Cited

U.S. PATENT DOCUMENTS

| | | | |
|---|---|---|---|
| 8,850,130 | B1 | 9/2014 | Aron et al. |
| 9,128,901 | B1* | 9/2015 | Nickurak ............ G06F 11/2094 |
| 9,311,121 | B2 | 4/2016 | Deshpande et al. |
| 9,529,807 | B2 | 12/2016 | Michael et al. |
| 9,613,064 | B1* | 4/2017 | Chou ..................... G06F 16/13 |
| 9,690,504 | B1* | 6/2017 | Natanzon .............. G06F 9/4411 |
| 9,772,866 | B1 | 9/2017 | Aron et al. |
| 9,823,973 | B1* | 11/2017 | Natanzon ............ G06F 11/1451 |
| 2010/0131794 | A1* | 5/2010 | Zheng ................ G06F 11/1438 714/6.1 |
| 2011/0231899 | A1* | 9/2011 | Pulier ................ H04L 63/0272 726/1 |
| 2013/0110778 | A1* | 5/2013 | Taylor ................ G06F 11/1435 707/624 |
| 2014/0082166 | A1* | 3/2014 | Robinson .............. G06F 9/5072 709/223 |
| 2015/0363282 | A1* | 12/2015 | Rangasamy ........ G06F 11/1451 714/4.12 |
| 2016/0048408 | A1* | 2/2016 | Madhu ................ G06F 11/2023 718/1 |
| 2016/0179437 | A1 | 6/2016 | Piduri et al. |
| 2017/0046230 | A1* | 2/2017 | Guzik ................ H04N 5/23206 |
| 2017/0083558 | A1* | 3/2017 | Vijayan ............... G06F 11/1464 |
| 2018/0181418 | A1* | 6/2018 | Elangovan .......... G06F 11/0712 |
| 2019/0163763 | A1* | 5/2019 | Pandey ................. G06F 11/301 |
| 2019/0207812 | A1* | 7/2019 | Li .......................... H04L 67/10 |
| 2019/0324786 | A1* | 10/2019 | Ranjan ................. G06F 9/5077 |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Sep. 4, 2015), from https://nutanixbible.com/.

Poitras, Steven. "The Nutanix Bible" (Jan. 12, 2016), from https://nutanixbible.com/.

Poitras, Steven. "The Nutanix Bible" (Jun. 9, 2016), from https://nutanixbible.com/.

Poitras, Steven. "The Nutanix Bible" (Jan. 3, 2017), from https://nutanixbible.com/.

Poitras, Steven. "The Nutanix Bible" (Jun. 8, 2017), from https://nutanixbible.com/.

Poitras, Steven. "The Nutanix Bible" (Jan. 3, 2018), from https://nutanixbible.com/.

Poitras, Steven. "The Nutanix Bible" (Jun. 25, 2018), from https://nutanixbible.com/.

Poitras, Steven. "The Nutanix Bible" (Jan. 8, 2019), from https://nutanixbible.com/.

Cano, I. et al., "Curator: Self-Managing Storage for Enterprise Clusters", *14th USENIX Symposium on Networked Systems Design and Implementation, NSDI '17*, (Mar. 27, 2017).

Commvault, "Commvault Complete™ Backup & Recovery datasheet", Datasheet, Commvault, (Jul. 24, 2018), date retrieved from google, from https://www.commvault.com/resources/commvault-complete-backup-recovery-datasheet.

Commvault, "Replication for Virtual Machines", V11 Service Pack 18, Commvault, (Last modified on Jun. 24, 2019), from http://documentation.commvault.com/commvault/v11/article?p=87228.htm.

Commvault, "Process for Configuring Replication", V11 Service Pack 18, Commvault, (Last modified on Jun. 24, 2019), from http://documentation.commvault.com/commvault/v11/article?p=87229.htm.

Commvault, "Creating a Replica Copy for Asynchronous Data Replication", V11 Service Pack 13, Commvault, (Last modified on Aug. 10, 2018), from https://documentation.commvault.com/commvault/v11_sp13/article?p=98720.htm.

Commvault, "Storage Policies Overview", V11 Service Pack 13, Commvault, (Last modified on Mar. 1, 2018), from https://documentation.commvault.com/commvault/v11_sp13/article?p=13804.htm.

Pope, Jason, "The Challenges of DR: Achieving Near-Zero RTO", Rubik General Tech, (May 11, 2017).

Rubrik, "Replication for Disaster Recovery", Data sheet, (Apr. 2017), from https://www.rubrik.com/wp-content/uploads/2017/04/Data-Sheet-Rubrik-Replication-and-Disaster-Recovery-DR.pdf.

Rubrik, "Replication and Disaster Recovery", (Dec. 19, 2019), date retrieved from google, from https://www.rubrik.com/en/solutions/replication-dr.

Alastair, "Replication with Rubrik Edge", Demitasse, (Dec. 5, 2017).

Zerto, "Real-Time Hypervisor-Based Replication", The IT Resilience Platform, (Apr. 10, 2019), date retrieved from google.

Zerto, "One-to-Many, Multi-Site Replication", The IT Resilience Platform, (Apr. 11, 2019), date retrieved from google.

VMware and Double-Take, "Double-Take® Replication in the VMware Environment: Building DR solutions using Double-Take and VMware Infrastructure and VMware Server", VMware and Double-Take Software Whitepaper, (Sep. 21, 2006).

VMware and Double-Take, "Disaster Recovery Virtualization", VMware and Double-Take Software Whitepaper, (Revised on Jul. 30, 2007).

Dell EMC, "RecoverPoint for Virtual Machines Version 5.2", RecoverPoint for Virtual Machines 5.2 Administrator's, Dell Inc., (May 2019).

AWS, "What Is an Application Load Balancer?", Amazon Web Services, Inc., (Jul. 21, 2017).

Sapatnekar, Mrunmayi, "Kloudless rolls out its enterprise SaaS offering", techseen, (Jul. 20, 2016).

Muthukkaruppan, Kannan, "Getting Started with Distributed Backups in YugaByte DB", Yugabyte, Inc. blog, (Nov. 19, 2018).

AWS, "Tutorial: Use Microservices as Targets with Your Application Load Balancer", Amazon Web Services, Inc., (Aug. 12, 2016), date retrieved from google.

VMware, Inc., "vSphere Replication for Disaster Recovery to Cloud", 41 Pages, vSphere Replication 6.5, (Jun. 28, 2017), date retrieved from google.

VMware, Inc., "vSphere Replication for Disaster Recovery to Cloud", 40 Pages, vSphere Replication 8.1 (Apr. 19, 2018), date retrieved from google.

VMware, Inc., "Disaster Recovery of Tier 1 Applications on VMware vCenter™ Site Recovery Manager" 26 Pages, (Jan. 14, 2015), date retrieved from google.

Khoshkholghi, M., et al., "Disaster Recovery in Cloud Computing: A Survey", (Sep. 2014), Computer and Information Science vol. 7, No. 3.

Cloud Seccurity Allicance, "Business Continuity/Disaster Recovery", (Sep. 15, 2012), SecaaS Implementation Guidance, Category 9, date retrieved from google.

(56) References Cited

OTHER PUBLICATIONS

Alhazmi, O, et al., "Evaluating Disaster Recovery Plans Using the Cloud" (Mar. 14, 2016).
AWS, "Backup and Recovery Approaches Using AWS" (Jun. 2016), Amazon Web Services.
Panzura, Inc., "Panzura Snapshot Technology" Date, Technology Brief.
Commvault, "Commvault Complete™ Backup and Recovery for Snapshots", Commvault Resource Library—Datasheet and Brochure, (Jan. 16, 2020), date retrieved from google.
Hosterman, C., "Commvault® IntelliSnap® Technology FlashArray Integration for VMware vSphere®" Pure Storage, (Oct. 2015).
Cisco, "Extending the Value of Cisco HyperFlex", Commvault Complete Backup & Recovery. (Aug. 30, 2016), date retrieved from google.
Poitras, Steven. "The Nutanix Bible" (Jul. 9, 2019), from https://nutanixbible.com/ (Publication date based on indicated capture date by Archive.org; first publication date unknown).

* cited by examiner

CONTEXT-BASED DISASTER RECOVERY

RELATED APPLICATIONS

The present application claims the benefit of priority to U.S. Patent Application Ser. No. 62/664,927 titled "CONTEXT-BASED DISASTER RECOVERY", filed on Apr. 30, 2018, which is hereby incorporated by reference in its entirety.

FIELD

This disclosure relates to highly available computing systems, and more particularly to techniques for context-based disaster recovery.

BACKGROUND

Computing resources in modern virtualized computing systems are often organized into groups. This organization into groups facilitates human cognition as well as computer management of then-current and/or anticipated tasks and/or applications. For example, one organization might associate a group of files and folders (e.g., a hierarchy) with one user and a different group of files and folders with another user. As another example, the notion of a user might imply associations, ownership or other relationships between that user and his/her applications, scripts, configurations, data, and other entities.

In modern virtualization systems, there are often many more types of entities and many more hierarchies and/or types of hierarchies than as heretofore mentioned. A particular grouping in a virtualized system might comprise various heterogeneous computing resource entities that are hierarchically associated in multiple parent-child relationships. For example, an application in a virtualized environment (e.g., the "parent") might comprise a virtual machine (VM) "child" entity, which in turn has two virtual disk (vDisk) "child" entities and a virtual network interface card (vNIC) "child" entity. A second application in a virtualization environment might comprise a VM that references an executable container (EC), multiple vDisks, multiple vNICs, and/or other computing resource entities. In such cases, the "parent" associated with a particular collection of computing resource entities defines a context of the computing resource entity. Entire contexts can be managed as an indivisible whole. Moreover, entire contexts are often managed in a manner that respects consistency throughout the full scope of the hierarchy. In many cases, a context might correspond to a particular user, or might correspond to a group of users (e.g., engineering, finance, etc.), or might correspond to a platform that serves a user or group of users.

For at least reasons of high-availability of platforms (e.g., high availability of applications, etc.), users often demand that the virtualized computing system have disaster recovery (DR) capabilities. In response to this demand, a computing system might implement various replication operations (e.g., snapshotting, cloning, deduplication, etc.) to support certain DR operations and/or restoration scenarios (e.g., failover, failback, etc.). For example, an on-premise computing system might store a time sequence of snapshots of the data of a particular vDisk at a first external backup service provider to facilitate recovery of such data if the node or nodes hosting the vDisk fails (e.g., due to power outage). As another example, the state and/or configuration of a VM at the on-premise computing system might also be tracked at a second external backup service provider so as to perform a failover migration of the VM (e.g., to a remote computing system) in response to a failure, and/or perform a failback restoration to the on-premise computing system when the failure mechanism precipitating the failover is removed (e.g., power is restored).

To facilitate the foregoing DR operations and/or other operations, the on-premise computing system sends/receives DR data (e.g., snapshot data, resource entity clone data, etc.) associated with multiple types of computing resource entities to/from multiple backup service providers. Any of these heterogeneous backup service providers (e.g., Amazon AWS, Microsoft Azure, etc.) might be selected for various reasons, such as reasons related to performance, security, cost, availability, and/or other metrics.

Unfortunately, each of the numerous combinations of computing resource entities and backup service providers can require a particular set of programming capabilities to perform DR operations. Specifically, a particular backup service provider might offer a set of tools to assist the user in establishing replication operations that use the provider's facilities. However, such tools are dedicated for use with that particular backup service provider, which can limit the ability of the user to select other providers for various reasons (e.g., performance, security, cost, availability, etc.). In other cases, a backup service provider might expose an application programming interface (API) to facilitate DR operations. However, such APIs are often rudimentary, offering limited functionality that pertains specifically to only a limited set of features. For example, an API from a backup service provider might offer commands to perform GET and PUT operations for a target computing resource entity. In this case, a significant burden is placed on the user to develop and implement a DR application that can manage disaster recovery for multiple computing resource entities over multiple contexts. What is needed is a uniform mechanism for managing disaster recovery operations over multiple computing resource entity and backup service provider combinations.

SUMMARY

The present disclosure describes techniques used in systems, methods, and in computer program products for context-based disaster recovery, which techniques advance the relevant technologies to address technological issues with legacy approaches. More specifically, the present disclosure describes techniques used in systems, methods, and in computer program products for provider-agnostic context-based disaster recovery. Certain embodiments are directed to technological solutions for implementing a provider-agnostic disaster recovery service layer to facilitate context-based disaster recovery of groups of computing resource entities comprising multiple entity types.

The disclosed embodiments modify and improve over legacy approaches. In particular, the herein-disclosed techniques provide technical solutions that address the technical problems attendant to efficient disaster recovery at selectable levels of granularity. Such technical solutions relate to improvements in computer functionality. Various applications of the herein-disclosed improvements in computer functionality serve to reduce the demand for computer memory, reduce the demand for computer processing power, reduce network bandwidth use, and reduce the demand for inter-component communication. Some embodiments disclosed herein use techniques to improve the functioning of multiple systems within the disclosed environments, and some embodiments advance peripheral technical fields as well. As specific examples, use of the disclosed computer equipment, networking equipment, and constituent devices within the shown environments as described herein and as depicted in the figures provide advances in the technical field of data storage in virtualized systems as well as advances in various technical fields related to distributed storage systems for disaster recovery.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1:
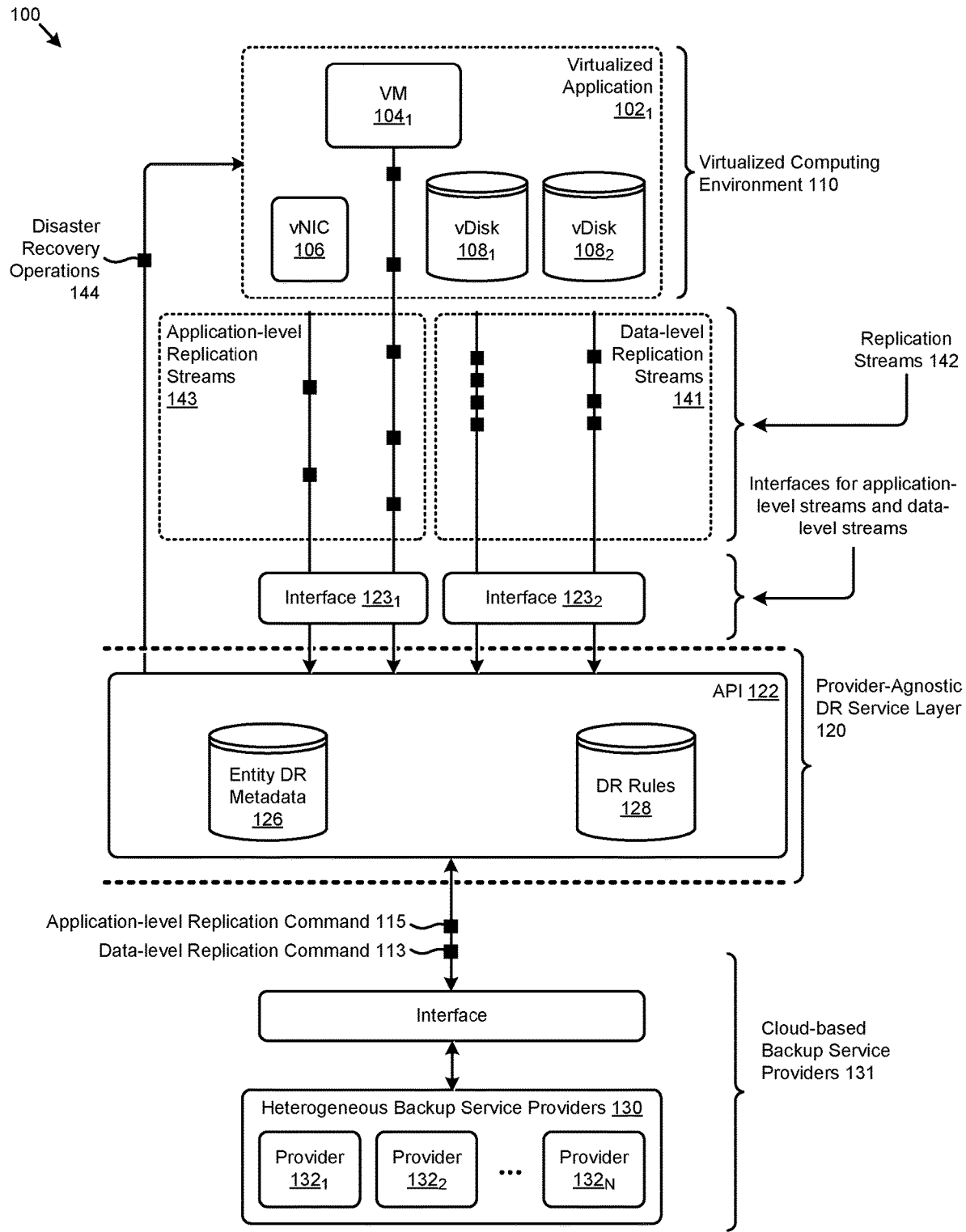
FIG. 1 illustrates a computing environment in which embodiments of the present disclosure can be implemented.

Embodiments in accordance with the present disclosure address the problem of efficient disaster recovery at selectable levels of granularity. Some embodiments are directed to approaches for implementing a provider-agnostic disaster recovery service layer to facilitate context-based disaster recovery of groups of computing resource entities comprising multiple entity types. The accompanying figures and discussions herein present example environments, systems, methods, and computer program products for provider-agnostic context-based disaster recovery.

Overview

When implementing high-availability virtualized computing systems, various techniques for disaster recovery might be employed. For example, a particular virtualized entity (e.g., a vDisk) in the virtualized computing system might be backed-up to a particular backup/storage provider that provides functions for data backup and disaster recovery. Such a backup might be performed on a regular basis, for example daily or hourly, etc. This sort of backup and the possibility for recovery after a disaster provides a subset of features that would be needed for disaster recovery. However, as disclosed herein, many more features can be automated through use of an application programming interface so as to provide features for a more robust disaster recovery. One such feature addresses consistency between virtualized entities. As an example, one feature of the API supports definition of states at the application level. The definition of states at the application level support handling of data underlying the application in a consistent manner. Application level handling includes accepting replication commands from a user. Such commands include syntax and semantics that identifies (a) data (e.g., possibly identified merely by the name of a virtual disk), and (b) at least some application state or configuration information that is stored in whole or in part in contents of another virtual disk. The data and the state are associated at various points in time such that the data and the state are known to be consistent with each other—at least at that moment in time. The API provides features that maintain consistency between virtualized entities.

As an example of one such feature, rules for taking consistent backup snapshots (e.g., changes or deltas in the virtualized entities) of any of a wide variety or types of virtualized entities can be subjected to ongoing backups/snapshots so as to be in a position for recovery of a particular context (e.g., a particular vDisk, a particular group of vDisks, a particular application and it state and data, etc.) to a particular point in time.

Data and/or application level consistent recovery is often complicated by the fact that, in many cases, one virtualized entity is related to another virtualized entity and therefore must be backed-up together and restored together. As such, an application or any other context can be defined using the API. When restoring a defined application or other context after a disaster, the application is restored in a manner such that the application's state and the application's data are consistent with each other. Doing this in an automated way, such as is provided by the API, relieves system administrators and users from having to process application data and application states separately.

A yet additional complication in performing backups and restores is the circumstance that there are many different backup providers, each of which support their own application programming interfaces and each of which support their own specific set of features.

To address the foregoing, the discussions hereunder disclose techniques for implementing a provider-agnostic disaster recovery service layer to facilitate context-based disaster recovery of groups of computing resource entities that comprise multiple entity types. In certain embodiments, the disaster recovery service layer exposes an API endpoint that can be called to perform various disaster recovery operations (e.g., replication operations). The API commands expose a uniform interface that can be called to process multiple types (e.g., kinds) of computing resource entities. The APIs can be applied to any types of entities and/or to any types of hierarchies of entities in a computing system.

On an ongoing basis, various streams of replication data (e.g., vDisk delta snapshots, VM configuration deltas, etc.) from the computing resource entities are processed by the API and/or its agents (e.g., middleware). A set of target storage rules are applied to the replication data to determine one or more target storage locations for the data. For example, a target storage rule might specify that replication data having a particular storage characteristic should be handled by a particular one of a plurality of heterogeneous backup service providers. Entity DR metadata corresponding to the received sets of replication data record the target storage locations and/or other information pertaining to the replication data. The entity DR metadata and/or the stored replication data are used to perform certain DR operations (e.g., failover, failback, etc.). In certain embodiments, the API and/or its agents are used to manage storage and retrieval of entity DR metadata. In certain embodiments, the entity DR metadata describes an association (e.g., context) of two or more computing resource entities that are to be processed in an application-consistent and/or data-consistent manner. In certain embodiments, the DR operations are performed in accordance with a set of recovery rules. For example, the recovery rules might indicate a certain order in which the DR operations are to be performed based at least in part on the context of the associated computing resource entities.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodi-ments" in various places throughout this specification are not necessarily referring to the same embodiment or embodiments. The disclosed embodiments are not intended to be limiting of the claims.

Descriptions of Example Embodiments

FIG. 1 illustrates a computing environment 100 in which embodiments of the present disclosure can be implemented. As an option, one or more variations of computing environment 100 or any aspect thereof may be implemented in the context of the architecture and functionality of the embodiments described herein.

FIG. 1 illustrates one aspect pertaining to implementing a provider-agnostic disaster recovery service layer to facilitate context-based disaster recovery of groups of computing resource entities comprising multiple entity types. FIG. 1 is presented to illustrate how such a provider-agnostic disaster recovery service layer is deployed in a computing environment.

The computing environment 100 of FIG. 1 includes a virtualized application $102_1$ (e.g., a virtual desktop) that comprises a set of computing resource entities that includes a virtual machine (e.g., VM $104_1$), two virtual disks (e.g., vDisk $108_1$ and vDisk $108_2$), and a virtual network interface card (e.g., vNIC 106). The foregoing computing resource entities operate within a virtualized computing environment 110. As shown, the vNIC and vDisks are associated with virtualized application $102_1$ which virtualized application defines a context for the entities. The foregoing computing resource entities may also be associated by hierarchical relationships, parent-child relationships, and/or other associations or relationships. For example, vDisk $108_1$, vDisk $108_2$, and vNIC 106 are "child" entities of VM $104_1$, which in turn is a "child" entity of virtualized application $102_1$. The associations of the entities can also be described in terms of hierarchical levels, with vDisk $108_1$, vDisk $108_2$, and vNIC 106 at a lowest level, VM $104_1$ at a next higher level, and virtualized application $102_1$ at a highest level.

Users of virtualized computing resource entities such as virtualized application $102_1$ and/or its constituent virtualized entities (e.g., VM $104_1$, vNIC 106, vDisk $108_1$, vDisk $108_2$, etc.) often demand that certain disaster recovery (DR) capabilities are implemented in the computing system. In response to this demand, various replication operations (e.g., snapshotting, cloning, deduplication, etc.) might be performed to support certain DR operations and/or restoration scenarios (e.g., failover, failback, etc.). As shown in computing environment 100, a set of heterogeneous backup service providers 130 (e.g., provider $132_1$, provider $132_2$, . . . , provider 132N) might be accessed to facilitate such data replication and/or disaster recovery operations. One or more of the heterogeneous backup service providers 130 might be selected to store the replication data from one or more of the computing resource entities in computing environment 100 so as to facilitate retrieval of such replication data in the event of a failure. However, as earlier described, there are challenges to implementing an efficient disaster recovery capability for multiple types of computing resource entities and/or backup service providers.

The herein disclosed techniques address such challenges by implementing a provider-agnostic DR service layer 120 to facilitate context-based disaster recovery of groups of computing resource entities that comprise multiple entity types, such as represented by virtualized application $102_1$. As can be observed, the provider-agnostic DR service layer 120 exposes an API 122 that can be called to perform various disaster recovery operations (e.g., replication operations) for various types (e.g., kinds) and/or combinations (e.g., contexts) of computing resource entities. Specifically, the API 122 and/or any of its corresponding interfaces (e.g., interface $123_1$ and interface $123_2$, as shown) can configured to process both (1) application level replication operations and (2) data-level replication operations between the virtualized computing environment 110 and a plurality of cloud-based backup service providers 131.

The API 122 receives replication streams 142 (e.g., vDisk delta snapshots, VM configuration deltas, vNIC configuration deltas, etc.) from the computing resource entities comprising virtualized application $102_1$. As shown, the replication streams comprise data-level replication streams 141 as well as application-level replication streams 143. Both the contents of the data-level replication streams 141 as well as the contents of the application-level replication streams 143 are received by API 122 for replication to a cloud-based backup service provider. More specifically, the contents of the replication data streams are processed by API 122 and/or a DR management agent to apply the replication data streams to a set of DR rules 128 to determine one or more target storage locations for the data. For example, certain target storage rules in DR rules 128 might specify that replication data having a particular storage characteristic should be processed by a particular one of a plurality of heterogeneous backup service providers 130.

To configure such rules, when an application that is subject to restoration starts up, it accesses the API with initialization information. The API in turn processes the initialization information pertaining to the accessing application so as to configure rules and to establish streams of replication commands and corresponding data. As replication commands of the streams are received at the API, the replication commands and corresponding replication data are processed in a specific manner that corresponds to the manner needed for replication into one or more target storage locations at the cloud-based backup service providers. As such, the API generates one or more provider-specific commands to perform a particular application level replication operation (e.g., via application-level command 115) as well as a particular data level replication operation (e.g., via data-level replication command 113) for storing content for the application to the cloud-based service provider. In some cases, a particular application level replication operation might be directed to a first cloud-based service provider, whereas a corresponding particular data level replication operation might be directed to a second cloud-based service provider.

As used herein, a data level replication operation refers to processing of stored data of a storage device that is accessed by a virtual machine, whereas an application level operation refers to processing a state of a virtual machine and/or its constituent virtualized entities with respect to a consistency state at a particular time.

The API forms a replication command that is specific to a particular application-level or is specific to a particular data-level stream. Strictly as one example, during operations that are performed during a restore operation that serves to restart an application after a failure, the generated application-level operation corresponds to a sequence of startup operations that gather backup data from one or more of the cloud-based service providers. In order to correspond an application and/or its constituent computing entities, to the locations of backup data stored at the cloud-based service provider, target storage locations and/or other information pertaining to the replication data is stored in a set of entity DR metadata 126. Thus, in the case of a failure that affects the virtualized application $102_1$, the entity DR metadata 126 and/or the stored replication data are accessed to perform certain disaster recovery operations 144 (e.g., failover operations, failback operations, etc.).

As shown, any instance comprising content that forms a first data-level application stream can be communicated to API 122 asynchronously with respect to any content that forms a second data-level application stream. Also, any instance comprising content that forms a first application-level application stream can be communicated to API 122 asynchronously with respect to any content that forms a second application-level application stream. Moreover, any instance comprising content that forms a data-level application stream can be communicated to API 122 asynchronously with respect to any content that forms an application-level application stream.

Implementing the provider-agnostic DR service layer 120 in computing environment 100 according to the herein disclosed techniques provides a technical solution that results in computer functionality improvements. Such techniques serve to reduce the demand for computer memory, reduce the demand for computer processing power, reduce network bandwidth use, and reduce the demand for inter-component communication. As an example, applying the herein disclosed techniques greatly reduces the programming effort to implement a disaster recovery management capability for multiple entity types and multiple backup service providers, thereby greatly reducing the use of processing, storage, and/or other computing resources consumed by such programming efforts.

One embodiment of techniques for context-based disaster recovery as facilitated by the techniques described herein is disclosed in further detail as follows.

Figure 2:
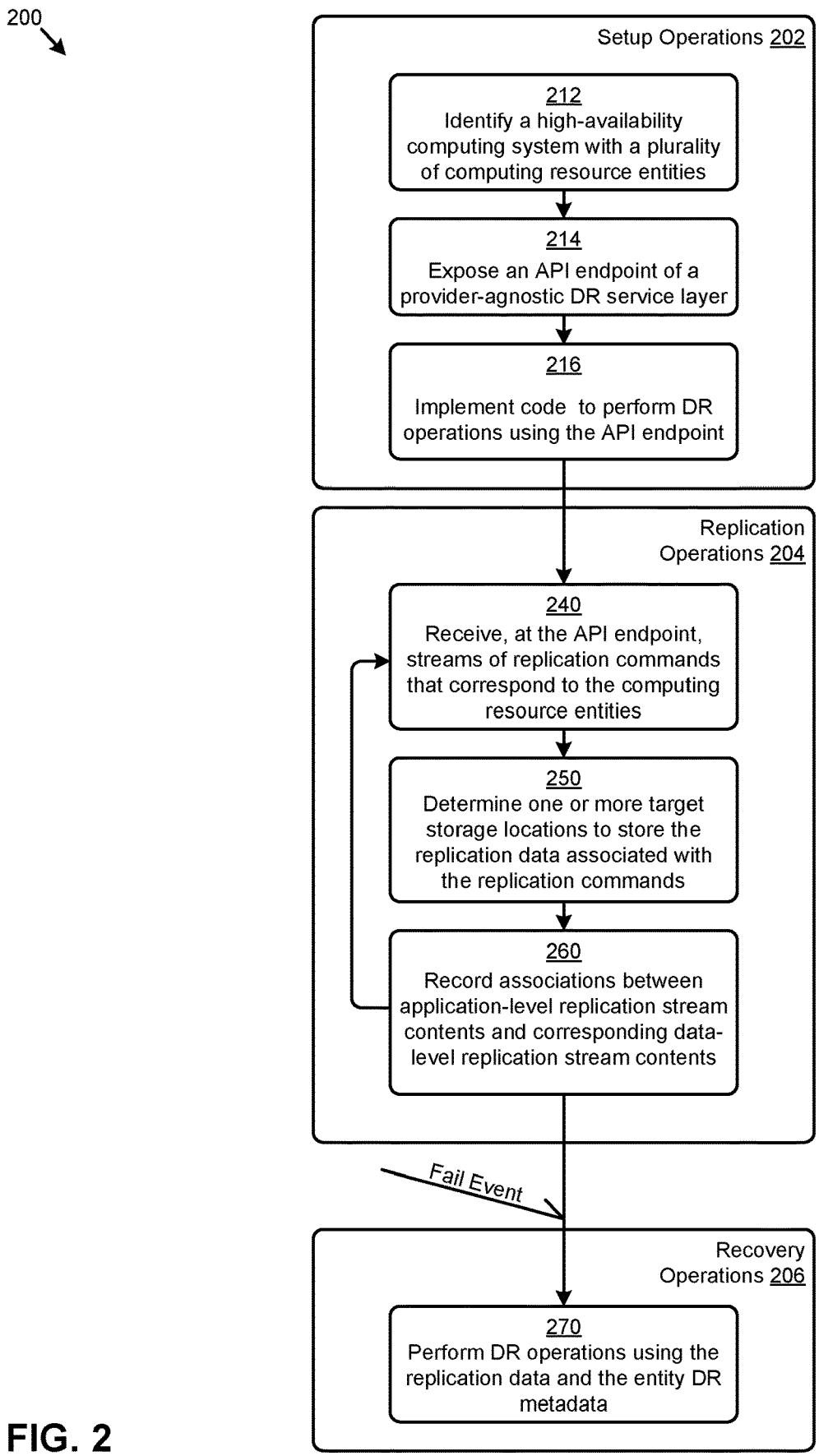
FIG. 2 depicts a context-based disaster recovery technique as implemented in systems that facilitate provider-agnostic context-based disaster recovery, according to an embodiment.

FIG. 2 depicts a context-based disaster recovery technique 200 as implemented in systems that facilitate provider-agnostic context-based disaster recovery. As an option, one or more variations of context-based disaster recovery technique 200 or any aspect thereof may be implemented in the context of the architecture and functionality of the embodiments described herein. The context-based disaster recovery technique 200 or any aspect thereof may be implemented in any environment.

FIG. 2 illustrates one aspect pertaining to implementing a provider-agnostic disaster recovery service layer to facilitate context-based disaster recovery of groups of computing resource entities comprising multiple entity types. Specifically, the figure is presented to show one embodiment of certain steps and/or operations that setup and use the herein disclosed techniques to achieve context-based disaster recovery.

As can be observed in FIG. 2, the steps and/or operations can be partitioned into a set of setup operations 202, a set of replication operations 204, and a set of recovery operations 206.

The setup operations 202 of context-based disaster recovery technique 200 can commence by identifying a high-availability computing system with a plurality of computing resource entities (step 212). Such a computing system might be, for example, a distributed computing system with virtualized entities (e.g., virtual machines, executable containers, virtual disks, etc.) that are managed so as to maintain a certain degree of availability to their users. As such, the distributed computing system will implement some level of disaster recovery capability to accommodate the needs of its users. According to the herein disclosed techniques, a context-based disaster recovery can be implemented at least in part by exposing an API endpoint of a provider-agnostic DR service layer (step 214). The API endpoint might be implemented in one or more nodes of the aforementioned high-availability computing system. Alternatively, the API endpoint might be implemented in whole or in part as middleware that is hosted at a location accessible to the aforementioned high-availability computing system. Irrespective of the particular partitioning of the exposed API endpoint, a DR management application that calls the API endpoint is implemented either in the computing system or in a location that is accessible to the computing system (step 216).

Given the foregoing configuration of the computing system and/or any implementation of middleware, streams of replication commands corresponding to the computing resource entities are received at the API endpoint (step 240). Replication commands for any entity type (e.g., VM, vDisk, application, etc.) are handled by the API. The replication commands comprise properties that describe the computing resource entity (or entities) associated with the command, any replication data associated with the command, and/or other information. The received replication commands are analyzed to determine one or more target storage locations to store the replication data associated with the replication commands (step 250). The target storage locations might be selected from a plurality of storage locations available at multiple heterogeneous backup storage providers.

Various associations between the application-level configurations of the computing resource entities and/or the data-level replication content, and/or other information (e.g., target storage locations, command properties, etc.), are recorded in a set of entity DR metadata (step 260). More specifically, the information in the entity DR metadata serves to record associations between application-level replication stream contents and corresponding data-level replication stream contents.

As can be observed by the flow path from step 260 to step 240, the steps and/or operations comprising the replication operations 204 can be characterized as ongoing or continuous. As such, the streams of replication commands from the computing resource entities will be continually received and processed (e.g., by operation of the API endpoint), at least until occurrence of some sort of a fail event associated with the entities is detected.

If a fail event occurs, the recovery operations 206 are invoked. Such recovery operations might include performing DR operations that are facilitated by the entity DR metadata and/or the replication data (step 270). For example, the entity DR metadata for a particular virtualized application might be consulted to determine the computing resource entities associated with the application, and to identify the location of the replication data corresponding to those entities, so as to perform a failback restoration of the application.

One embodiment of a system for implementing the context-based disaster recovery technique 200 and/or other herein disclosed techniques is disclosed as follows.

Figure 3:
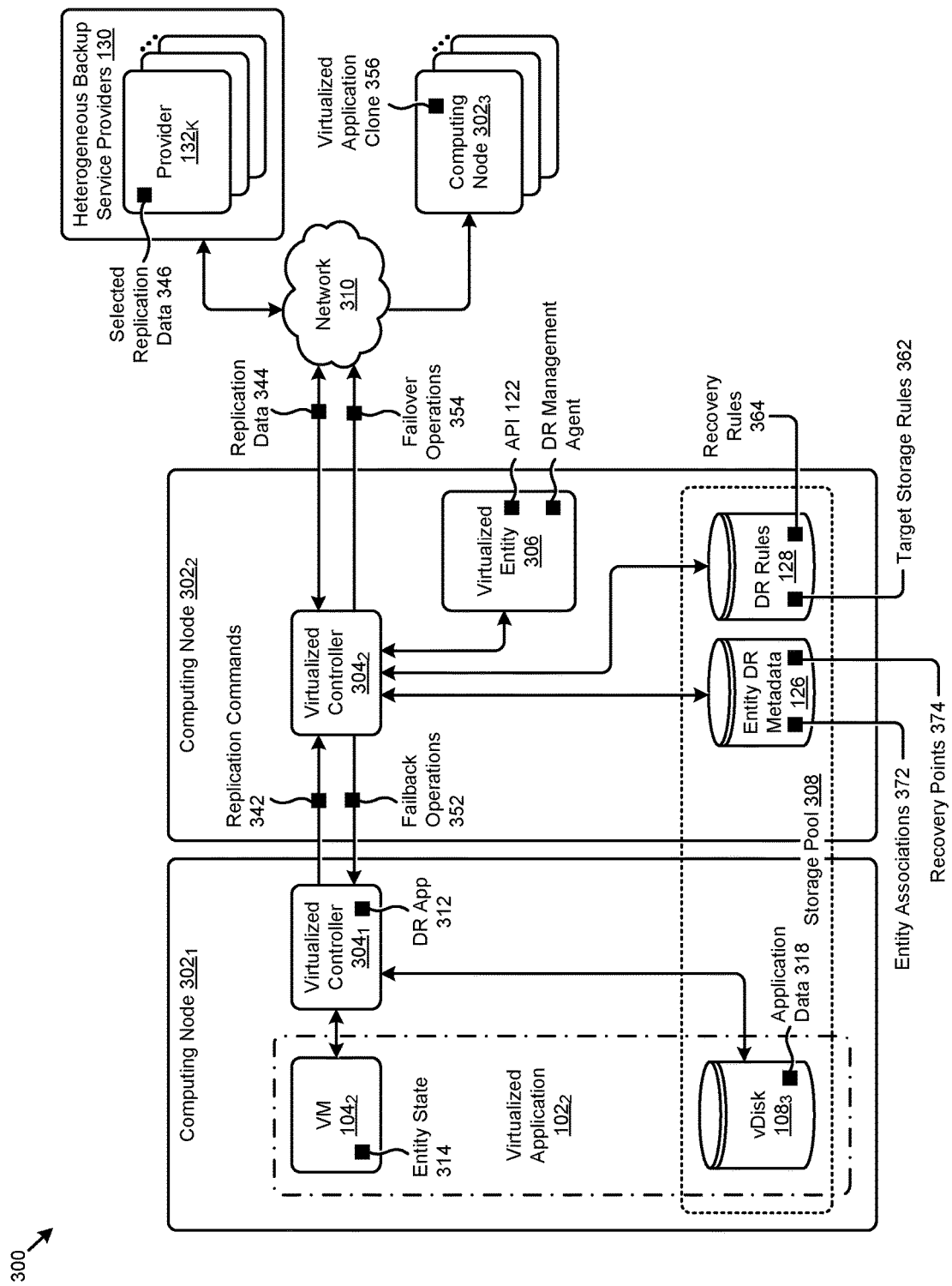
FIG. 3 presents a block diagram of a system for provider-agnostic context-based disaster recovery, according to an embodiment.

FIG. 3 presents a block diagram 300 of a system for provider-agnostic context-based disaster recovery. As an option, one or more variations of block diagram 300 or any aspect thereof may be implemented in the context of the architecture and functionality of the embodiments described herein. The block diagram 300 or any aspect thereof may be implemented in any environment.

FIG. 3 illustrates one aspect pertaining to implementing a provider-agnostic disaster recovery service layer to facilitate context-based disaster recovery of groups of computing resource entities comprising multiple entity types. Specifically, the figure is presented to show one embodiment of the components, data structures, and data flows of a system in which the herein disclosed techniques are deployed and utilized. The components, data structures, and data flows shown in FIG. 3 present one partitioning and associated data manipulation approach. The specific example shown is purely exemplary, and other subsystems, data structures, and/or partitioning are reasonable.

The system of FIG. 3 depicts a computing node $302_1$ that is hosting a virtualized application $102_2$ comprising a VM $104_2$ and a vDisk $108_3$. The computing node $302_1$ also hosts a virtualized controller $304_1$ that controls the input/output (I/O) operations between VM $104_2$ and vDisk $108_3$. The virtualized controller $304_1$ may perform other operations. As an example, virtualized controller $304_1$ might select from a storage pool 308 the physical location of the data associated with vDisk $108_3$.

A computing node $302_2$ hosts a virtualized entity 306 at which the API 122 and any DR management agents are implemented. The entity DR metadata 126 and the DR rules 128 are accessed by the DR management agent through a virtualized controller $304_2$ at computing node $302_2$. As such, an instance of a provider-agnostic DR service layer as described herein is implemented at computing node $302_2$. The data and components associated with such a DR service layer will often be confined to an availability zone that is separate from any availability zone comprising computing resource entities that the DR service is protecting. For example, while the entity DR metadata 126 and the DR rules 128 are logically depicted in FIG. 3 as sharing the storage pool 308 with vDisk $108_3$, the physical location of the underlying data of the entity DR metadata 126 and the DR rules 128 will be stored in an availability zone that is separate from the availability zone in which the underlying data of vDisk $108_3$ is stored. Further, computing node $302_2$ will be in an availability zone that is separate from the availability zone comprising computing node $302_1$.

As can be observed, the API 122 is exposed to virtualized controller $304_1$ through virtualized controller $304_2$ at computing node $302_2$. A code base (e.g., DR app 312) can be implemented in virtualized controller $304_1$ to access the API 122 to perform various replication operations. Specifically, DR app 312 can issue instances of replication commands 342 from the computing resource entities of virtualized application $102_2$ to API 122 through virtualized controller $304_2$. The replication commands 342 can correspond to streams of replication data that comprise changes (e.g., deltas) to an entity state 314 of VM $104_2$ and/or changes (e.g., deltas) to the application data 318 of vDisk $108_3$.

Properties of replication commands 342 are applied to a set of target storage rules 362 in DR rules 128 to determine one or more target storage locations for the replication data associated with the replication commands. As facilitated by the herein disclosed techniques, the target storage locations can be from any number of heterogeneous backup service providers 130, which can be accessed by virtualized controller $304_2$ over a network 310. As merely an example, a provider 132K might be selected to store a set of selected replication data 346 from the corpus of replication data 344 sent by a DR management agent (e.g., through virtualized controller $304_2$) to be stored at the heterogeneous backup service providers 130. The DR management agent will further manage (e.g., create, update, or delete) the entity DR metadata 126, which at least describes a set of entity associations 372 (e.g., high-level contexts) and a set of recovery points 374. The structure, content, and other attributes of the entity DR metadata 126 are discussed in further detail herein and as pertains to FIG. 6.

If a fail event (e.g., computing node $302_1$ failure) associated with virtualized application $102_2$ is detected, DR management agent will access the entity DR metadata 126 to identify recovery points corresponding to virtualized application $102_2$. The properties of the identified recovery points are applied to a set of recovery rules 364 to determine one or more DR operations to perform. As one example, a set of failover operations 354 might be invoked by DR management agent to create a virtualized application clone 356 (e.g., a clone of virtualized application $102_2$) at a computing node $302_3$. When the failure is removed (e.g., computing node $302_1$ is recovered), a set of failback operations 352 can be invoked by DR management agent to spawn a new instance of virtualized application $102_2$ at computing node $302_1$.

The foregoing discussions include techniques for receiving replication data associated with streams of replication commands (e.g., step 240 of FIG. 2), which techniques are disclosed in further detail as follows.

Figure 4:
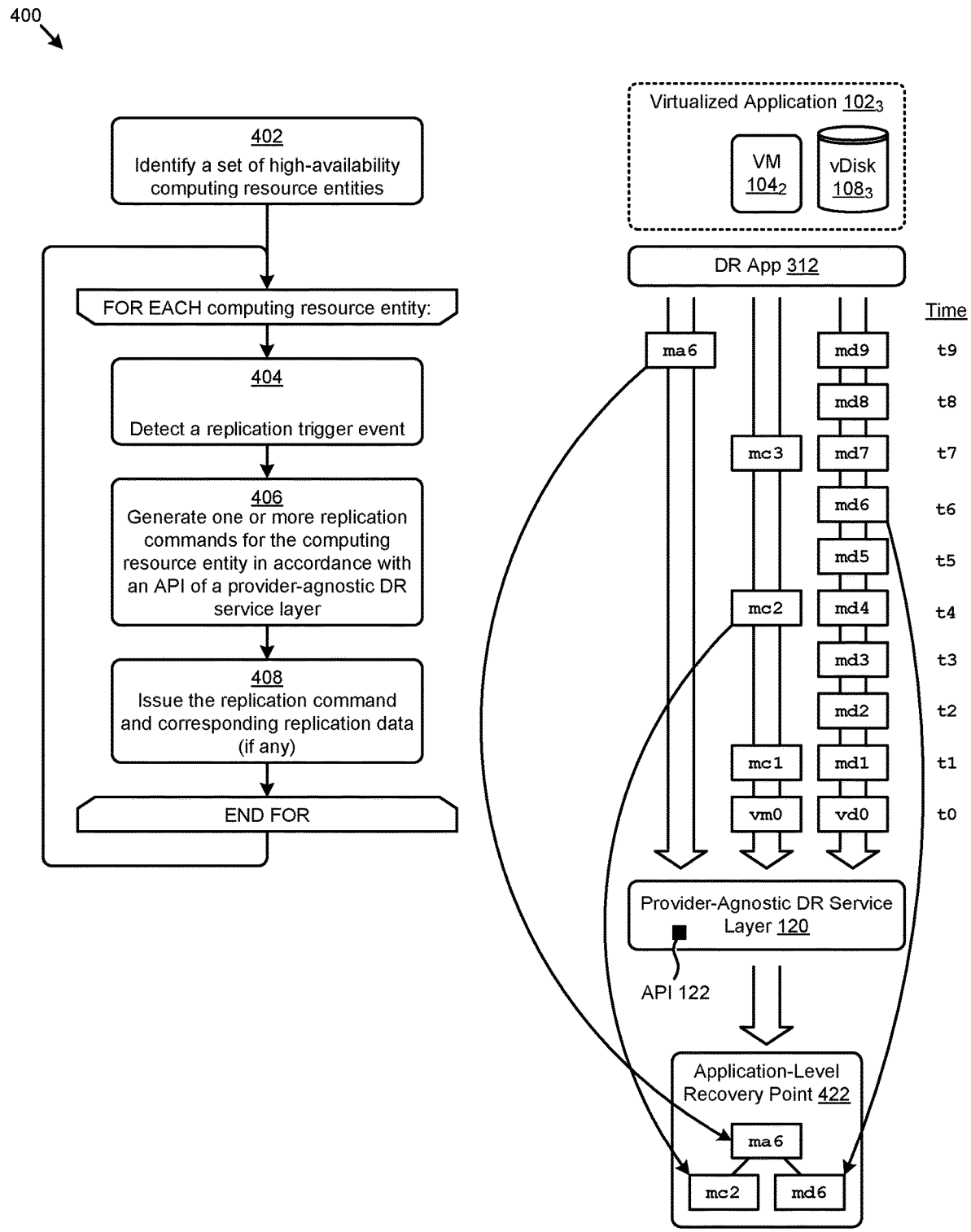
FIG. 4 presents a data replication technique as implemented in systems that facilitate provider-agnostic context-based disaster recovery, according to an embodiment.

FIG. 4 presents a data replication technique 400 as implemented in systems that facilitate provider-agnostic context-based disaster recovery. As an option, one or more variations of data replication technique 400 or any aspect thereof may be implemented in the context of the architecture and functionality of the embodiments described herein. The data replication technique 400 or any aspect thereof may be implemented in any environment.

FIG. 4 illustrates one aspect pertaining to implementing a provider-agnostic disaster recovery service layer to facilitate context-based disaster recovery of groups of computing resource entities comprising multiple entity types. Specifically, the figure is presented to illustrate one embodiment of certain steps and/or operations for issuing replication data to the provider-agnostic disaster recovery service layer so as to facilitate context-based disaster recovery.

The data replication technique 400 can commence by identifying a set of high-availability computing resource entities (step 402). As illustrated in FIG. 4, an example of such high-availability computing resource entities might be VM $104_2$ and vDisk $108_3$ of virtualized application $102_3$ earlier described. For each of the computing resource entities, a data replication trigger event for the entity is detected (step 404). As an example, a replication schedule associated with a computing resource entity might invoke a data replication trigger event at some regular cadence. More specifically, a schedule established to enforce a recovery point objective (RPO) of one hour will invoke a data replication trigger event every hour. As another example, a data replication trigger event might be invoked in response to some change in certain data associated with the computing resource entity.

One or more replication commands for the computing resource entity is generated in accordance with an API of a provider-agnostic DR service layer as disclosed herein (step 406). As illustrated, DR app 312 might generate replication commands (e.g., for VM $104_2$, vDisk $108_3$, and virtualized application $102_3$) in accordance with API 122 of provider-agnostic DR service layer 120. The replication commands are commands issued to an API to perform some function related to data-level replication and/or application-level replication, and/or DR, according to the herein disclosed techniques. For example, a replication command might be an HTTP "POST" call to an API endpoint (e.g., URI) to store a delta snapshot associated with a vDisk. Such replication commands often comprise a set of replication command properties that are structured for processing at the API endpoint by the API code and/or by its agents.

As an example, at least some of the replication command properties might describe a recovery point for a particular computing resource entity. If the subject computing resource entity is an entity having underlying data (e.g., application data, configuration data, etc.), then the replication command properties might comprise information pertaining to the underlying data. In other cases, a replication command might be issued merely to associate two or more entity recovery points and not have any associated replication data. When the replication commands are generated, they are issued with any replication data (step 408) that may correspond to the then-current state of the particular computing resource. More specifically, the replication command embodies both data level replication operations as well as application-level operations. In some embodiments, and in some occurrences, any particular application-level operation may correspond to a sequence of startup operations to restore and then restart the application. The sequence can be ordered such that any dependencies in underlying data (e.g., hierarchical dependencies) is observed when restarting the application.

As can be observed by the flow shown in FIG. 4, the steps and/or operations comprising the "FOR" loop can be characterized as ongoing or continuous, which results in multiple independent streams of replication commands and/or replication data from the computing resource entities.

FIG. 4 illustrates such independent replication command streams generated by DR app 312 and submitted to API 122 of provider-agnostic DR service layer 120. As can be observed, replication commands that create entity objects (e.g., identified by "vm0" and "vd0") for tracking of replication data and recovery points for VM $104_2$ and vDisk $108_3$, respectively, are issued at time "t0". A stream of replication commands associate data-level replication content with application-level replication content. Specifically, a stream of replication commands associates certain data-level content (e.g., application data) with vDisk $108_3$ to define recovery points (e.g., identified by markers "md1", "md2", "md3", "md4", "md5", "md6", "md7", "md8", and "md9") for vDisk $108_3$ at times "t1", "t2", "t3", "t4", "t5", "t6", "t7", "t8", and "t9", respectively. Further, a stream of replication commands associates certain application-level content (e.g., state or configuration data) with VM $104_2$ to create recovery points (e.g., identified by markers "mc1", "mc2", and "mc3") for VM $104_2$ at times "t1", "t4", and "t7", respectively.

The data-level content and/or any application-level content or configurations (e.g., metadata and/or markers, etc.) can be stored using the same storage mechanism. For example, data and VM configuration data can be stored in vDisks in the storage pool. As an alternative, data-level content can be stored using a first storage mechanism (e.g., a first mechanism that is tuned for storage and retrieval of large amounts of data), whereas application-level configuration data and/or metadata might be stored using second storage mechanism (e.g., a second mechanism that is tuned for resiliency and fast access to metadata). Strictly as one example, the second storage mechanism might involve use of a distributed metadata processors where metadata is distributed over a sharded database rather than being stored in a storage pool.

In some cases, a replication command is formed so as to associate two or more computing resource entities into a hierarchical recovery point description. Any number of such replication commands that include any number of hierarchical recovery point descriptions can be issued even without specification of any underlying replication data. One example of a hierarchical recovery point description is illustrated in FIG. 4. As shown, a replication command associated with virtualized application $102_3$ is issued by DR app 312 to create an application-level recovery point 422 (e.g., identified by marker "ma6"). While the replication command that creates recovery point "ma6" is issued at time "t9", the command specifies the recovery point is to be at time "t6". In this case, the recovery points for VM $104_2$ and vDisk $108_3$ closest to time "t6" (e.g., "mc2" and "md6", respectively) are selected for the application-level recovery point 422. In some cases, recovery point "ma6" might be referred to as a "named" (e.g., specified) recovery point, whereas recovery points "mc2" and "md6" might be referred to as "unnamed" (e.g., unspecified) recovery points.

Using the aforementioned DR metadata and/or any information derived from the application-level recovery point 422, the application can be restored to an application-consistent state.

Further details regarding general approaches to restoring applications to an application-consistent state are described in U.S. patent Ser. No. 15/178,504 titled "SAVING AND RESTORING STORAGE DEVICES USING APPLICATION—CONSISTENT SNAPSHOTS", filed on Jun. 9, 2016, which is hereby incorporated by reference in its entirety.

Command Structures

The following discloses example command structures for various types of replication commands. The construct "{kind}" in the examples is a placeholder for the entity type (e.g., "vm", "vdisk", etc.). Also, the construct "{uuid}" in the examples is a placeholder for the unique identifier of the computing resource entity. An example structure of a replication command to create an entity object is presented in Table 1.

TABLE 1

Entity object creation command

| Line | Command pseudo-code |
|---|---|
| 01 | POST /{kind}_recovery_points/ |
| 02 | spec: { |
| 03 |   "resources": { |
| 04 |     "parent_reference": |
| 05 |       $ref: "#definitions/{{kind}}_recovery_point_reference", |
| 06 |     "marker_id": int, |
| 07 |     "expiration_time" : datetime, |
| 08 |     "ancestry_identifier" : string, |
| 09 |   } |
| 10 |   "placement_affinity_policy": { |
| 11 |     "any_reference": |
| 12 |       $ref: "#definitions/reference" |
| 13 |   } |
| 14 | } |
| 15 | "metadata": { |
| 16 |   "kind": "{{kind}}_recovery_point" |
| 17 |   "uuid": UUID |
| 18 | } |

An example structure of a replication command to update an entity object is presented in Table 2.

TABLE 2

Entity object update command

| Line | Command pseudo-code |
|---|---|
| 01 | PUT /{kind}_recovery_points/{uuid} |
| 02 | spec: { |
| 03 |   "resources": { |
| 04 |     "expiration_time" : datetime, |
| 05 |     "annotation" : string |
| 06 |   } |
| 07 | } |

An example structure of a replication command to delete an entity object is presented in Table 3.

TABLE 3

Entity object delete command

| Line | Command pseudo-code |
|---|---|
| 01 | DELETE /{kind}_recovery_points/{uuid} |

An example structure of a replication command to get an entity object is presented in Table 4.

TABLE 4

Entity object get command

| Line | Command pseudo-code |
|---|---|
| 01 | GET /{kind}_recovery_points/{uuid} |

An example structure of a replication command to list entity objects is presented in Table 5.

TABLE 5

Entity object list command

| Line | Command pseudo-code |
|---|---|
| 01 | POST /{kind}_recovery_points/list |

An example structure of a replication command to list markers for an entity object is presented in Table 6. Markers can be used along with replication data (e.g., deltas) to transfer interleaved replication data. Markers can be specified, or automatically determined (e.g., as monotonically increasing integers).

TABLE 6

Entity object market list command

| Line | Command pseudo-code |
|---|---|
| 01 | POST /{kind}_recovery_point/{{uuid}}/list_markers |
| 02 | response: { |
| 03 |   marker_list: [ |
| 04 |     "marked_id" : int64, |
| 05 |     "client_timestamp" : datetime, |
| 06 |   ] |

An example structure of a replication command to write a replication data delta is presented in Table 7.

TABLE 7

Replication data delta write command

| Line | Command pseudo-code |
|---|---|
| 01 | POST /{kind}_recovery_points/{uuid}/write_deltas |
| 02 | body: { |
| 03 |    "delta": { |
| 04 |       "offset": integer, |
| 05 |       "length": integer, |
| 06 |       "data": bytes, |
| 07 |       "marker_id" : int64, |
| 08 |       "prev_marker_id" : int64, |
| 09 |       "client_marker_timestamp": date-time, |
| 10 |       "opaque_client_annotation": bytes, |
| 11 |       "delta_options": |
| 12 |    } |
| 13 |    delta_list: [ |
| 14 |       "delta": "#definition/delta" |
| 15 |    ] |
| 16 | } |

An example structure of a replication command to list replication data deltas is presented in Table 8.

TABLE 8

Replication data delta list command

| Line | Command pseudo-code |
|---|---|
| 01 | POST /{kind}_recovery_points/list_deltas |
| 02 | body: { |
| 03 |    "{kind}_recovery_point_reference": |
| 04 |       $ref: "#definitions/{kind}_recovery_point_reference" |
| 05 |    "starting_{kind}_recovery_point_reference": |
| 06 |       $ref: "#definitions/{kind}_recovery_point_reference" |
| 07 |    "start_offset": integer |
| 08 |    "end_offset": integer |
| 09 | } |
| 10 | |
| 11 | response: { |
| 12 |    "delta": { |
| 13 |       "next_offset": integer, |
| 14 |       "region_list": [ |
| 15 |          "offset": integer, |
| 16 |          "length": integer, |
| 17 |          "type": |
| 18 |             x-ntnx-enum: |
| 19 |                - ZEROED |
| 20 |                - REGULAR |
| 21 |       ] |
| 22 |    } |
| 23 | } |

An example structure of a replication command to read a replication data delta is presented in Table 9.

TABLE 9

Replication data delta read command

| Line | Command pseudo-code |
|---|---|
| 01 | POST /{kind}_recovery_points/{uuid}/read_deltas |
| 02 | body: { |
| 03 |    "delta": [ |
| 04 |       "offset": integer, |
| 05 |       "length": integer, |
| 06 |    ] |
| 07 | } |

TABLE 9-continued

Replication data delta read command

| Line | Command pseudo-code |
|---|---|
| 08 | response: { |
| 09 |    delta_list: [ |
| 10 |       "delta": "#definition/delta", |
| 11 |       "data": bytes |
| 12 |    ] |
| 13 | } |

The foregoing discussions include techniques for determine one or more target storage locations for replication data (e.g., step 250 of FIG. 2), which techniques are disclosed in further detail as follows.

Figure 5:
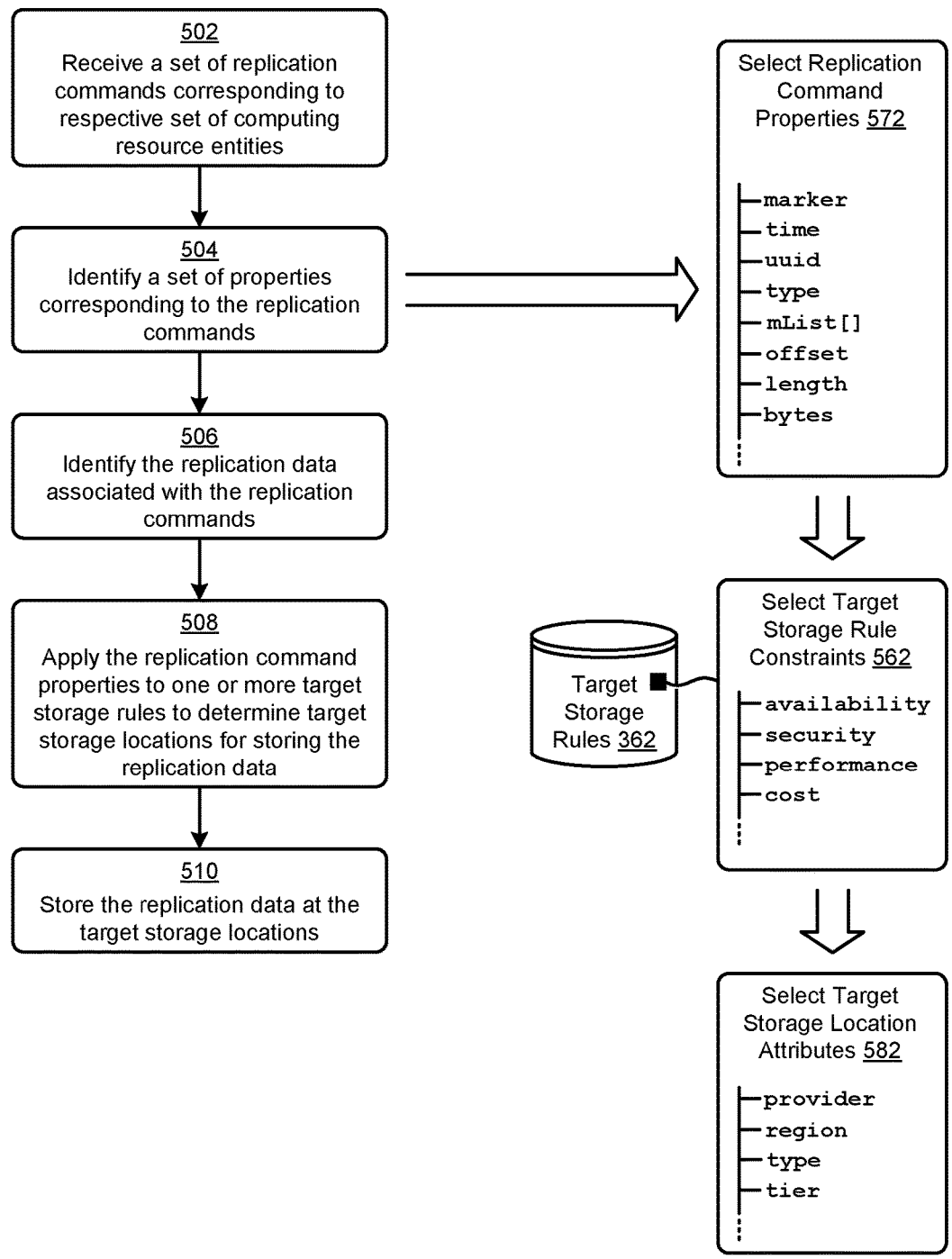
FIG. 5 presents a storage location selection technique as implemented in systems that facilitate provider-agnostic context-based disaster recovery, according to an embodiment.

FIG. 5 presents a storage location selection technique 500 as implemented in systems that facilitate provider-agnostic context-based disaster recovery. As an option, one or more variations of storage location selection technique 500 or any aspect thereof may be implemented in the context of the architecture and functionality of the embodiments described herein. The storage location selection technique 500 or any aspect thereof may be implemented in any environment.

FIG. 5 illustrates one aspect pertaining to implementing a provider-agnostic disaster recovery service layer to facilitate context-based disaster recovery of groups of computing resource entities comprising multiple entity types. Specifically, the figure is presented to illustrate one embodiment of certain steps and/or operations for determining the target storage locations of replication data associated with the groups of computing resource entities.

The storage location selection technique 500 can commence by receiving a set of replication commands corresponding to a respective set of computing resource entities (step 502). Various properties corresponding to the replication commands are identified (step 504). As earlier described, the replication command properties might be included (e.g., as key-value pairs) in various programming objects issued with the commands. As illustrated in a set of select replication command properties 572, such properties might include a recovery point marker identifier (e.g., associated with a "marker" key), a time stamp (e.g., associated with a "time" key), an entity unique identifier (e.g., associated with a "uuid" key), a type value (e.g., associated with a "type" key), a list of related recovery point markers (e.g., associated with an "mList [ ]" object), a data offset value (e.g., associated with an "offset" key), a data length value (e.g., associated with a "length" key), a number of bytes of data (e.g., associated with a "bytes" key), and/or other properties. The replication data associated with the replication commands are also identified (step 506). As an example, the "offset" and "length" properties might facilitate identification of the replication data.

The identified replication command properties are applied to one or more target storage rules (e.g., target storage rules 362) to determine the target storage locations to store the replication data (step 508). A set of rules (e.g., rule base) such as target storage rules 362 or any other rules described herein, comprise data records storing various information that can be used to form one or more constraints to apply to certain functions and/or operations. For example, the information pertaining to a rule in the rule base might comprise the conditional logic operands (e.g., input variables, conditions, constraints, etc.) and/or operators (e.g., "if", "then", "and", "or", "greater than", "less than", etc.) for forming a conditional logic statement that returns one or more results.

As shown, aspects pertaining to the "availability", "security", "performance", and "cost" of a candidate storage location are captured in a set of select target storage rule constraints 562. Any one or more of the constraints might be considered singly or in combination when determining a target storage location.

When the target storage locations have been determined, the replication data is stored at the target storage locations (step 510). As depicted in a set of select target storage location attributes 582, a particular target storage location might be characterized by a provider identifier (e.g., associated with a "provider" attribute), a storage region (e.g., associated with a "region" attribute), a storage type (e.g., associated with a "type" attribute), a storage tier (e.g., associated with a "tier" attribute), and/or other attributes.

The foregoing discussions include techniques for formatting and recording certain information into a set of entity DR metadata (e.g., step 260 of FIG. 2). Some such formatting and recording techniques are disclosed in further detail as follows.

Figure 6:
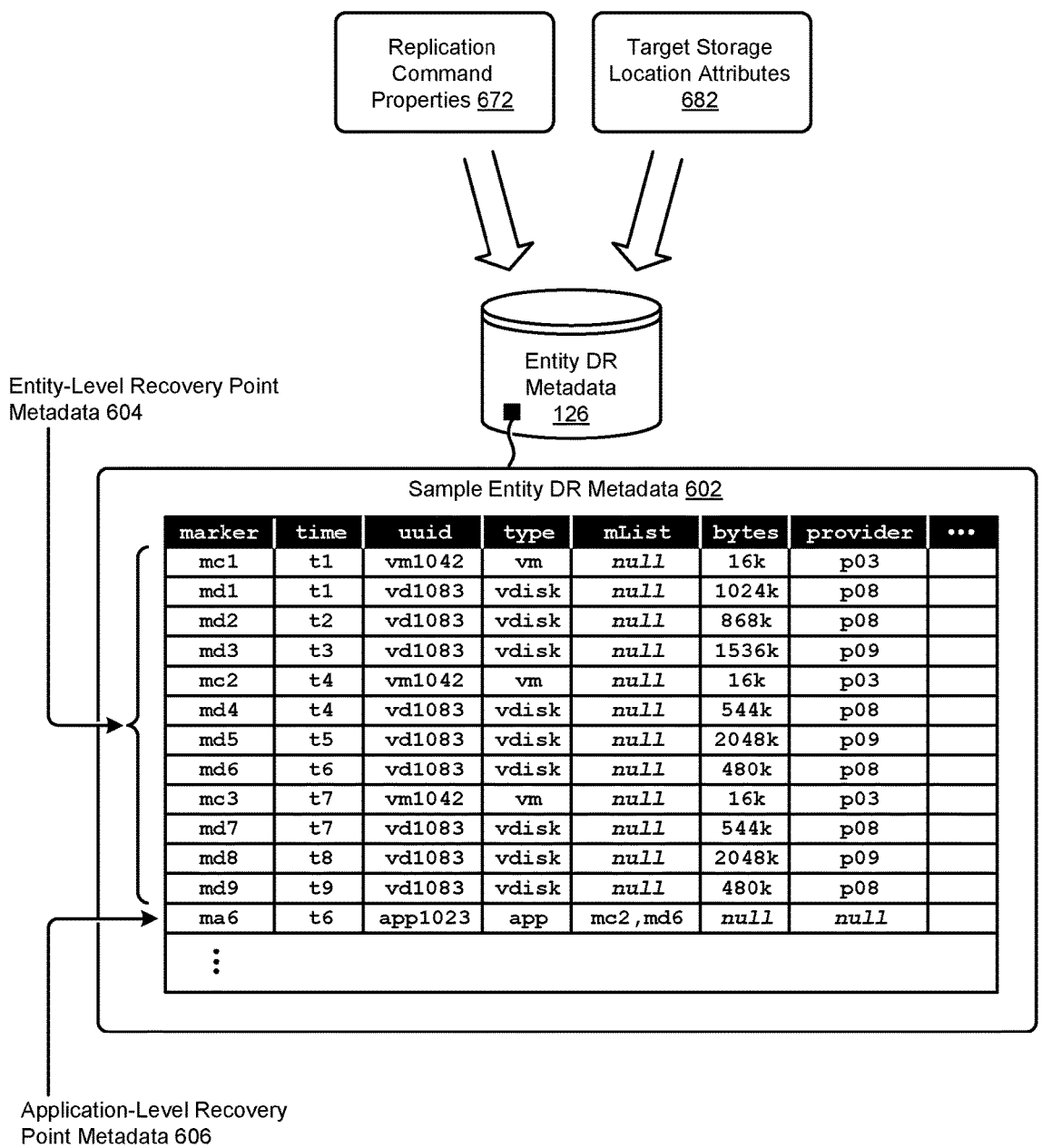
FIG. 6 presents a replication data tracking technique as implemented in systems that facilitate provider-agnostic context-based disaster recovery, according to some embodiments.

FIG. 6 presents a replication data tracking technique 600 as implemented in systems that facilitate provider-agnostic context-based disaster recovery. As an option, one or more variations of replication data tracking technique 600 or any aspect thereof may be implemented in the context of the architecture and functionality of the embodiments described herein. The replication data tracking technique 600 or any aspect thereof may be implemented in any environment.

FIG. 6 illustrates one aspect pertaining to implementing a provider-agnostic disaster recovery service layer to facilitate context-based disaster recovery of groups of computing resource entities comprising multiple entity types. Specifically, the figure is presented to illustrate one embodiment of a data structure for storing metadata used by the herein disclosed techniques to record associations between the various computing resource entities and their replication data.

As shown in FIG. 6, various instances of replication command properties 672, target storage location attributes 682, and/or other data are combined to form the entity DR metadata 126. The entity DR metadata 126 and/or any other data described herein can be organized and/or stored using various techniques. For example, the sample entity DR metadata 602 selected from entity DR metadata 126 indicates that the metadata might be organized and/or stored in a tabular structure (e.g., relational database table), which tabular structure includes rows that relate various data replication attributes with a particular computing resource entity. As another example, the metadata might be organized and/or stored in a programming code object that has instances corresponding to a particular computing resource entity and properties corresponding to the various attributes associated with the computing resource entity.

As depicted in sample entity DR metadata 602, a data record (e.g., table row or object instance) for a particular computing resource entity might describe a marker identifier (e.g., stored in a "marker" field), a time stamp (e.g., stored in a "time" field), a unique identifier for the computing resource entity (e.g., stored in a "uuid" field), an entity type (e.g., stored in a "type" field), a list of associated markers (e.g., stored in an "mList" field), a number of bytes of corresponding replication data (e.g., stored in a "bytes" field), a storage provider identifier (e.g., stored in a "provider" field), and/or other user attributes. With the data structure illustrated in FIG. 6, various instances of entity-level recovery points can be recorded in entity-level recovery point metadata 604. Further, higher level recovery points that amalgamate recovery points from two or more entities can also be captured in the shown data structure of entity DR metadata 126. For example, a set of application-level recovery point metadata 606 defines a recovery point at time "t6" that is identified with market "ma6" and comprises recovery point "mc2" from VM "vm1042" and recovery point "md6" from vDisk "vd1083".

The foregoing discussions include techniques for performing disaster recovery operations in systems that implement the herein disclosed techniques (e.g., step 270 of FIG. 2), which techniques are disclosed in further detail as follows.

Figure 7:
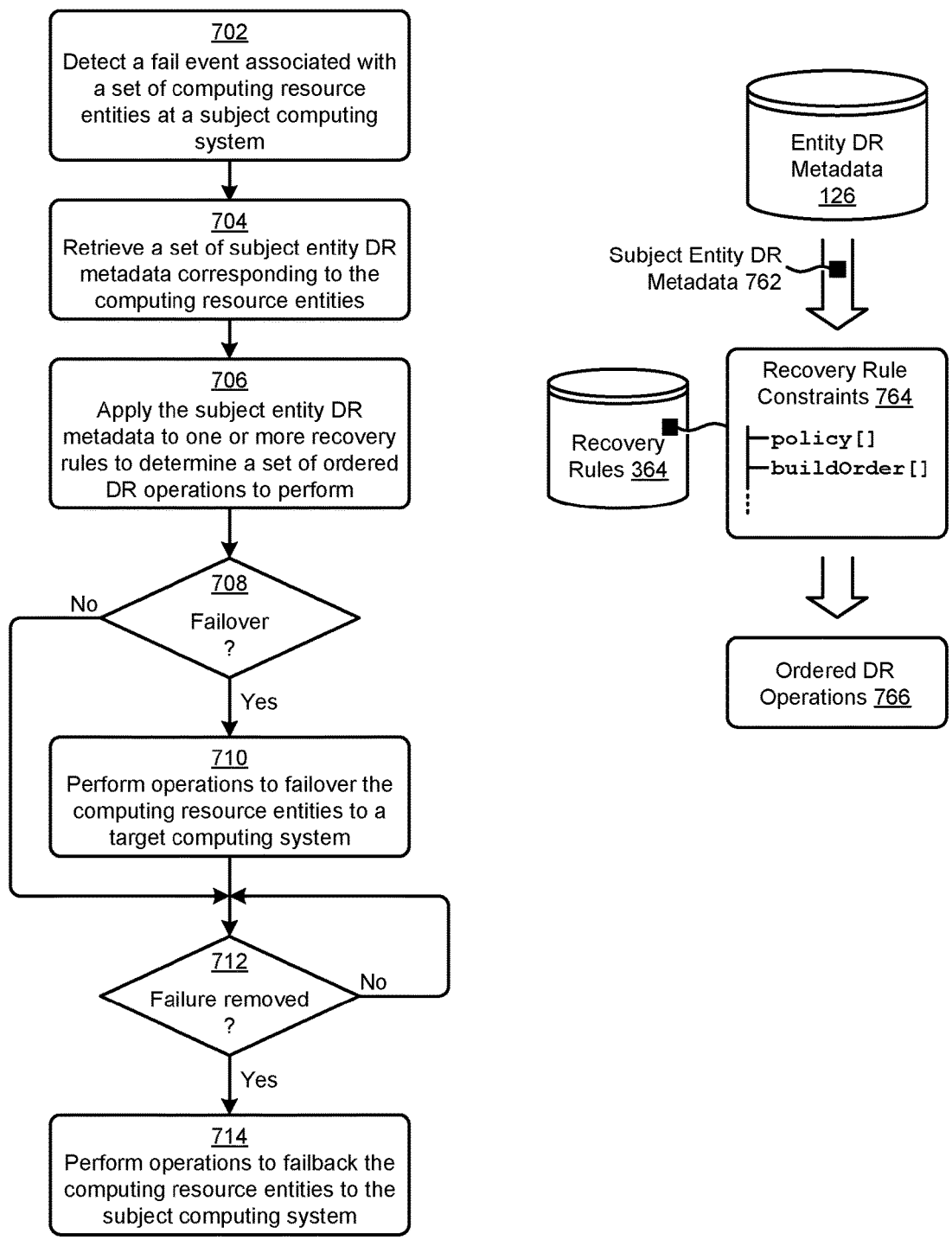
FIG. 7 presents a data recovery technique as implemented in systems that facilitate provider-agnostic context-based disaster recovery, according to some embodiments.

FIG. 7 presents a data recovery technique 700 as implemented in systems that facilitate provider-agnostic context-based disaster recovery. As an option, one or more variations of data recovery technique 700 or any aspect thereof may be implemented in the context of the architecture and functionality of the embodiments described herein. The data recovery technique 700 or any aspect thereof may be implemented in any environment.

The data recovery technique 700 can commence by detecting a fail event associated with a set of computing resource entities at a subject computing system (step 702). In response to the fail event, a set of subject entity DR metadata corresponding to the computing resource entities is retrieved (step 704). As illustrated, a set of subject entity DR metadata 762 might be selected from the entity DR metadata 126. The subject entity DR metadata is applied to one or more recovery rules to determine a set of ordered DR operations to perform (step 706). As an example, the subject entity DR metadata 762 is applied to the recovery rules 364 to determine a set of ordered DR operations 766. As can be observed, a set of recovery rule constraints 764 pertaining to one or more policies (e.g., stored in a "policy [ ]" object), one or more entity build orders (e.g., stored in a "buildOrder[ ]" object), and/or other constraints might be considered with determining the ordered DR operations 766.

If a failover is to be performed (see "Yes" path of decision 708), then operations to failover the computing resource entities to a target computing system are performed (step 710). If no failover is necessary (see "No" path of decision 708) or a failover has been completed, then if the failure at the subject computing system is not yet removed (see "No" path of decision 712), no action can be taken. When the failure at the subject computing system is removed (see "Yes" path of decision 712), operations to failback the computing resource entities to the subject computing system are performed (step 714).

ADDITIONAL EMBODIMENTS OF THE DISCLOSURE

Additional Practical Application Examples

Figure 8A:
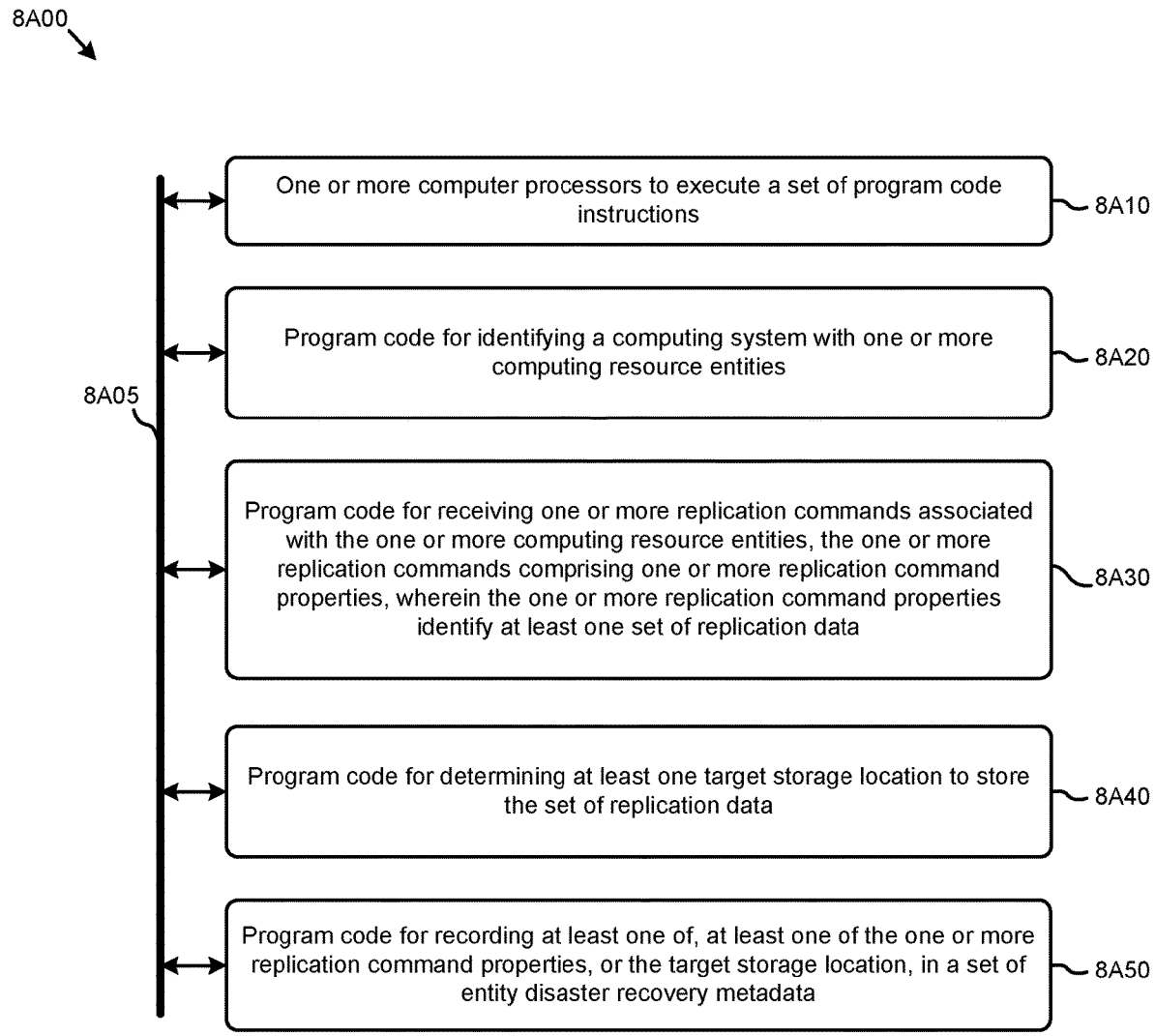
FIG. 8A and FIG. 8B depict system components as arrangements of computing modules that are interconnected so as to implement certain of the herein-disclosed embodiments.

FIG. 8A depicts a system 8A00 as an arrangement of computing modules that are interconnected so as to operate cooperatively to implement certain of the herein-disclosed embodiments. This and other embodiments present particular arrangements of elements that, individually and/or as combined, serve to form improved technological processes that address efficient disaster recovery at selectable levels of granularity. The partitioning of system 8A00 is merely illustrative and other partitions are possible. As an option, the system 8A00 may be implemented in the context of the architecture and functionality of the embodiments described herein. Of course, however, the system 8A00 or any operation therein may be carried out in any desired environment. The system 8A00 comprises at least one processor and at least one memory, the memory serving to store program instructions corresponding to the operations of the system. As shown, an operation can be implemented in whole or in part using program instructions accessible by a module. The modules are connected to a communication path 8A05, and any operation can communicate with other operations over communication path 8A05. The modules of the system can, individually or in combination, perform method operations within system 8A00. Any operations performed within system 8A00 may be performed in any order unless as may be specified in the claims. The shown embodiment implements a portion of a computer system, presented as system 8A00, comprising one or more computer processors to execute a set of program code instructions (module 8A10) and modules for accessing memory to hold program code instructions to perform: identifying a computing system with one or more computing resource entities (module 8A20); receiving one or more replication commands associated with the one or more computing resource entities, the one or more replication commands comprising one or more replication command properties, wherein the one or more replication command properties identify at least one set of replication data (module 8A30); determining at least one target storage location to store the set of replication data (module 8A40); and recording at least one of, at least one of the one or more replication command properties, or the target storage location, in a set of entity disaster recovery metadata (module 8A50).

Some embodiments are configured such that the one or more computing resource entities comprise a plurality of entity types. Some embodiments are configured such that the target storage location is determined based at least in part on one or more target storage rules. Some embodiments are configured such that the target storage location is selected from a plurality of storage locations at a plurality of heterogeneous backup service providers. Some embodiments are configured such that at least one of the replication commands associates two or more of the one or more computing resource entities. Some embodiments are configured such that the two or more of the one or more computing resource entities are associated by at least one of, a hierarchical relationship, a parent-child relationship, an application, or a context.

Some embodiments are configured such that the one or more replication commands are received at an API. Some embodiments are configured such that two or more of the one or more replication commands are received sequentially, asynchronously, or concurrently. Some embodiments further comprise steps for storing the set of replication data at the target storage location, and/or may further comprise steps for determining one or more disaster recovery operations, the one or more disaster recovery operations determined based at least in part on at least one of, the set of entity disaster recovery metadata, the set of replication data, or one or more recovery rules. Some embodiments are configured such that the one or more disaster recovery operations comprise at least one of, one or more ordered disaster recovery operations, one or more failover operations, or one or more failback operations.

Variations of the foregoing may include more or fewer of the shown modules. Certain variations may perform more or fewer (or different) steps and/or certain variations may use data elements in more or in fewer (or different) operations.

Still further, some embodiments include variations in the operations performed, and some embodiments include variations of aspects of the data elements used in the operations.

Figure 8B:
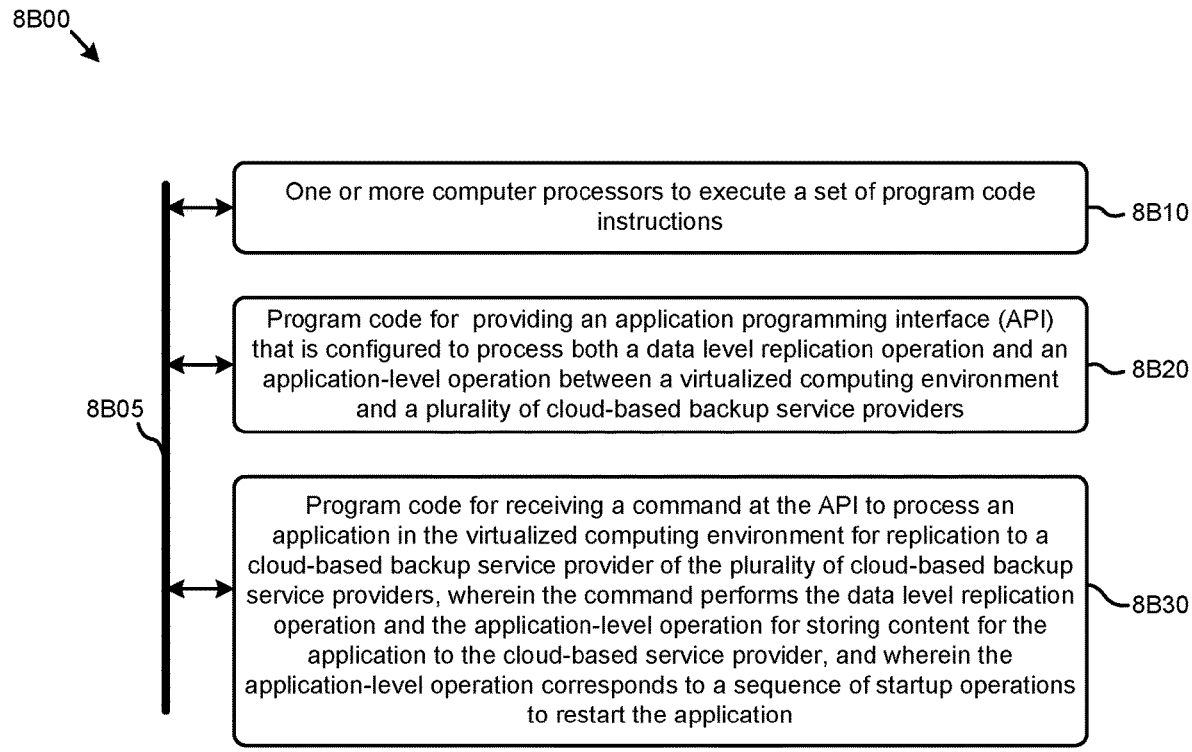

FIG. 8B depicts a system 8B00 as an arrangement of computing modules that are interconnected so as to operate cooperatively to implement certain of the herein-disclosed embodiments. This and other embodiments present particular arrangements of elements that, individually and/or as combined, serve to form improved technological processes that address efficient disaster recovery at selectable levels of granularity. The partitioning of system 8B00 is merely illustrative and other partitions are possible. As an option, the system 8B00 may be implemented in the context of the architecture and functionality of the embodiments described herein. Of course, however, the system 8B00 or any operation therein may be carried out in any desired environment.

The system 8B00 comprises at least one processor and at least one memory, the memory serving to store program instructions corresponding to the operations of the system. As shown, an operation can be implemented in whole or in part using program instructions accessible by a module. The modules are connected to a communication path 8B05, and any operation can communicate with any other operations over communication path 8B05. The modules of the system can, individually or in combination, perform method operations within system 8B00. Any operations performed within system 8B00 may be performed in any order unless as may be specified in the claims. The shown embodiment implements a portion of a computer system, presented as system 8B00, comprising one or more computer processors to execute a set of program code instructions (module 8B10) and modules for accessing memory to hold program code instructions that perform steps for: providing an application programming interface (API) that is configured to process both a data level replication operation and an application-level operation between a virtualized computing environment and a plurality of cloud-based backup service providers (module 8B20); and receiving a command at the API to process an application in the virtualized computing environment for replication to a cloud-based backup service provider of the plurality of cloud-based backup service providers, wherein the command performs the data level replication operation and the application-level operation for storing content for the application to the cloud-based service provider, and wherein the application-level operation corresponds to a sequence of startup operations to restart the application (module 8B30).

System Architecture Overview
Additional System Architecture Examples

Figure 9A:
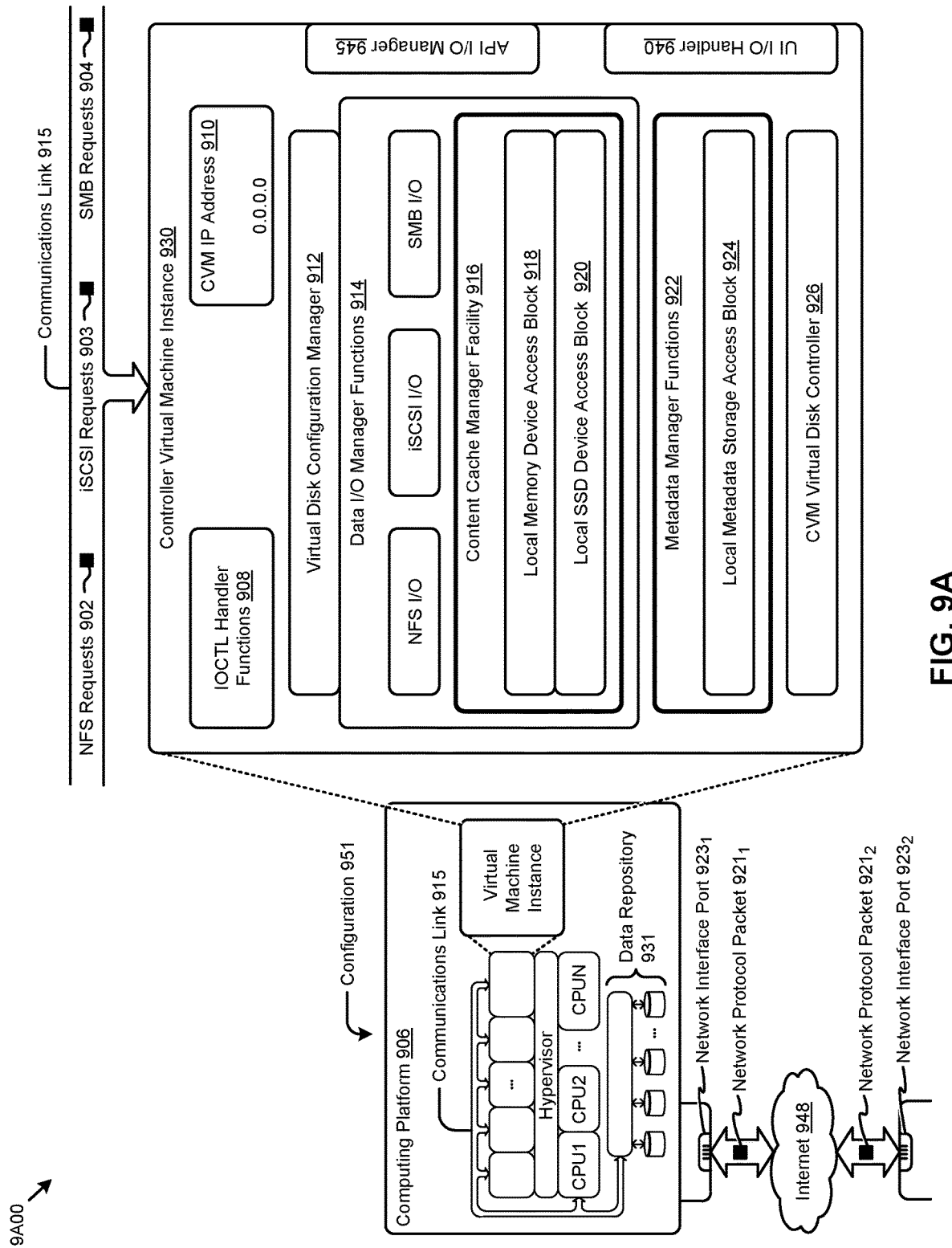
FIG. 9A, FIG. 9B, and FIG. 9C depict virtualized controller architectures comprising collections of interconnected components suitable for implementing embodiments of the present disclosure and/or for use in the herein-described environments.

FIG. 9A depicts a virtualized controller as implemented by the shown virtual machine architecture 9A00. The heretofore-disclosed embodiments, including variations of any virtualized controllers, can be implemented in distributed systems where a plurality of networked-connected devices communicate and coordinate actions using inter-component messaging. Distributed systems are systems of interconnected components that are designed for, or dedicated to, storage operations as well as being designed for, or dedicated to, computing and/or networking operations. Interconnected components in a distributed system can operate cooperatively to achieve a particular objective, such as to provide high performance computing, high performance networking capabilities, and/or high performance storage and/or high capacity storage capabilities. For example, a first set of components of a distributed computing system can coordinate to efficiently use a set of computational or compute resources, while a second set of components of the same distributed storage system can coordinate to efficiently use a set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 9A00 comprises a collection of interconnected components suitable for implementing embodiments of the present disclosure and/or for use in the herein-described environments. Moreover, virtual machine architecture 9A00 includes a virtual machine instance in configuration 951 that is further described as pertaining to controller virtual machine instance 930. Configuration 951 supports virtual machine instances that are deployed as user virtual machines, or controller virtual machines or both. Such virtual machines interface with a hypervisor (as shown). Some virtual machines include processing of storage I/O (input/output or IO) as received from any or every source within the computing platform. An example implementation of such a virtual machine that processes storage I/O is depicted as 930.

In this and other configurations, a controller virtual machine instance receives block I/O (input/output or IO) storage requests as network file system (NFS) requests in the form of NFS requests 902, and/or internet small computer storage interface (iSCSI) block IO requests in the form of iSCSI requests 903, and/or Samba file system (SMB) requests in the form of SMB requests 904. The controller virtual machine (CVM) instance publishes and responds to an internet protocol (IP) address (e.g., CVM IP address 910). Various forms of input and output (I/O or IO) can be handled by one or more IO control handler functions (e.g., IOCTL handler functions 908) that interface to other functions such as data IO manager functions 914 and/or metadata manager functions 922. As shown, the data IO manager functions can include communication with virtual disk configuration manager 912 and/or can include direct or indirect communication with any of various block IO functions (e.g., NFS IO, iSCSI IO, SMB IO, etc.).

In addition to block IO functions, configuration 951 supports IO of any form (e.g., block IO, streaming IO, packet-based IO, HTTP traffic, etc.) through either or both of a user interface (UI) handler such as UI IO handler 940 and/or through any of a range of application programming interfaces (APIs), possibly through API IO manager 945.

Communications link 915 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or persistent random access memories (RAPMs) or optical or magnetic media drives such as paper tape or magnetic tape drives. Volatile media includes dynamic memory such as random access memory. As shown, controller virtual machine instance 930 includes content cache manager facility 916 that accesses storage locations, possibly including local dynamic random access memory (DRAM) (e.g., through local memory device access block 918) and/or possibly including accesses to local solid state storage (e.g., through local SSD device access block 920).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of external data repository 931, which in turn can be formatted into any one or more storage areas, and which can comprise parameterized storage accessible by a key (e.g., a filename, a table name, a block address, an offset address, etc.). External data repository 931 can store any forms of data, and may comprise a storage area dedicated to storage of metadata pertaining to the stored forms of data. In some cases, metadata can be divided into portions. Such portions and/or cache copies can be stored in the external storage data repository and/or in a local storage area (e.g., in local DRAM areas and/or in local SSD areas). Such local storage can be accessed using functions provided by local metadata storage access block 924. External data repository 931 can be configured using CVM virtual disk controller 926, which can in turn manage any number or any configuration of virtual disks.

Execution of the sequences of instructions to practice certain embodiments of the disclosure are performed by one or more instances of a software instruction processor, or a processing element such as a data processor, or such as a central processing unit (e.g., CPU1, CPU2, CPUN). According to certain embodiments of the disclosure, two or more instances of configuration 951 can be coupled by communications link 915 (e.g., backplane, LAN, PSTN, wired or wireless network, etc.) and each instance may perform respective portions of sequences of instructions as may be required to practice embodiments of the disclosure.

The shown computing platform 906 is interconnected to the Internet 948 through one or more network interface ports (e.g., network interface port $923_1$ and network interface port $923_2$). Configuration 951 can be addressed through one or more network interface ports using an IP address. Any operational element within computing platform 906 can perform sending and receiving operations using any of a range of network protocols, possibly including network protocols that send and receive packets (e.g., network protocol packet $921_1$ and network protocol packet $921_2$).

Computing platform 906 may transmit and receive messages that can be composed of configuration data and/or any other forms of data and/or instructions organized into a data structure (e.g., communications packets). In some cases, the data structure includes program code instructions (e.g., application code) communicated through the Internet 948 and/or through any one or more instances of communications link 915. Received program code may be processed and/or executed by a CPU as it is received and/or program code may be stored in any volatile or non-volatile storage for later execution. Program code can be transmitted via an upload (e.g., an upload from an access device over the Internet 948 to computing platform 906). Further, program code and/or the results of executing program code can be delivered to a particular user via a download (e.g., a download from computing platform 906 over the Internet 948 to an access device).

Configuration 951 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

A module as used herein can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to provider-agnostic context-based disaster recovery. In some embodiments, a module may include one or more state machines and/or combinational logic used to implement or facilitate the operational and/or performance characteristics pertaining to provider-agnostic context-based disaster recovery.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of provider-agnostic context-based disaster recovery). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to provider-agnostic context-based disaster recovery and/or for improving the way data is manipulated when performing computerized operations pertaining to implementing a provider-agnostic disaster recovery service layer to facilitate context-based disaster recovery of groups of computing resource entities comprising multiple entity types.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTU- ALIZATION ENVIRONMENT", issued on Oct. 1, 2013, which is hereby incorporated by reference in its entirety.

Figure 9B:
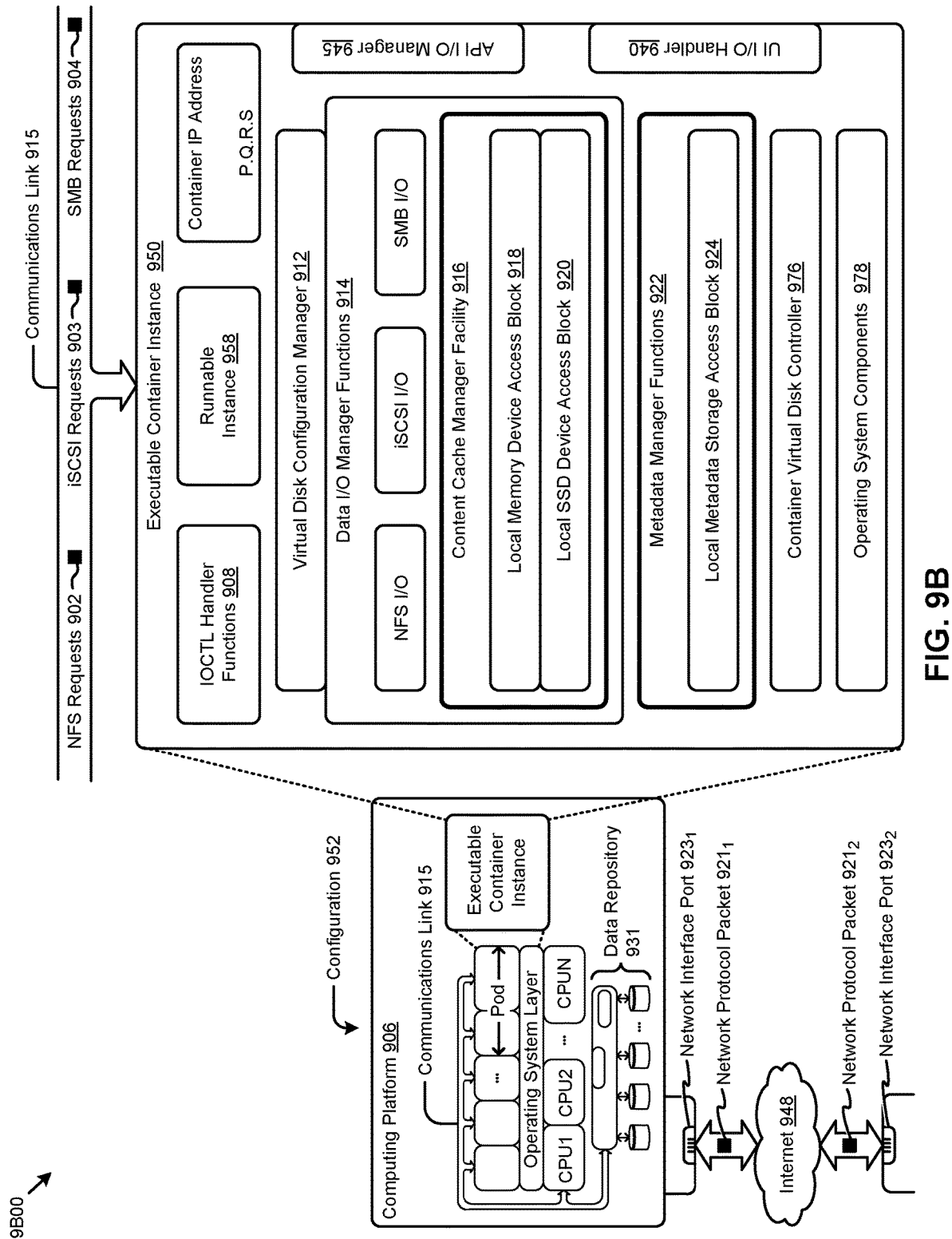

FIG. 9B depicts a virtualized controller implemented by containerized architecture 9B00. The containerized architecture comprises a collection of interconnected components suitable for implementing embodiments of the present disclosure and/or for use in the herein-described environments. Moreover, the shown containerized architecture 9B00 includes an executable container instance in configuration 952 that is further described as pertaining to executable container instance 950. Configuration 952 includes an operating system layer (as shown) that performs addressing functions such as providing access to external requestors via an IP address (e.g., "P.Q.R.S", as shown). Providing access to external requestors can include implementing all or portions of a protocol specification (e.g., "http:") and possibly handling port-specific functions.

The operating system layer can perform port forwarding to any executable container (e.g., executable container instance 950). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance (e.g., a Docker container instance) can serve as an instance of an application container or as a controller executable container. Any executable container of any sort can be rooted in a directory system, and can be configured to be accessed by file system commands (e.g., "ls" or "ls -a", etc.). The executable container might optionally include operating system components 978, however such a separate set of operating system components need not be provided. As an alternative, an executable container can include runnable instance 958, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 976. Such a container virtual disk controller can perform any of the functions that the aforementioned CVM virtual disk controller 926 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 9C:
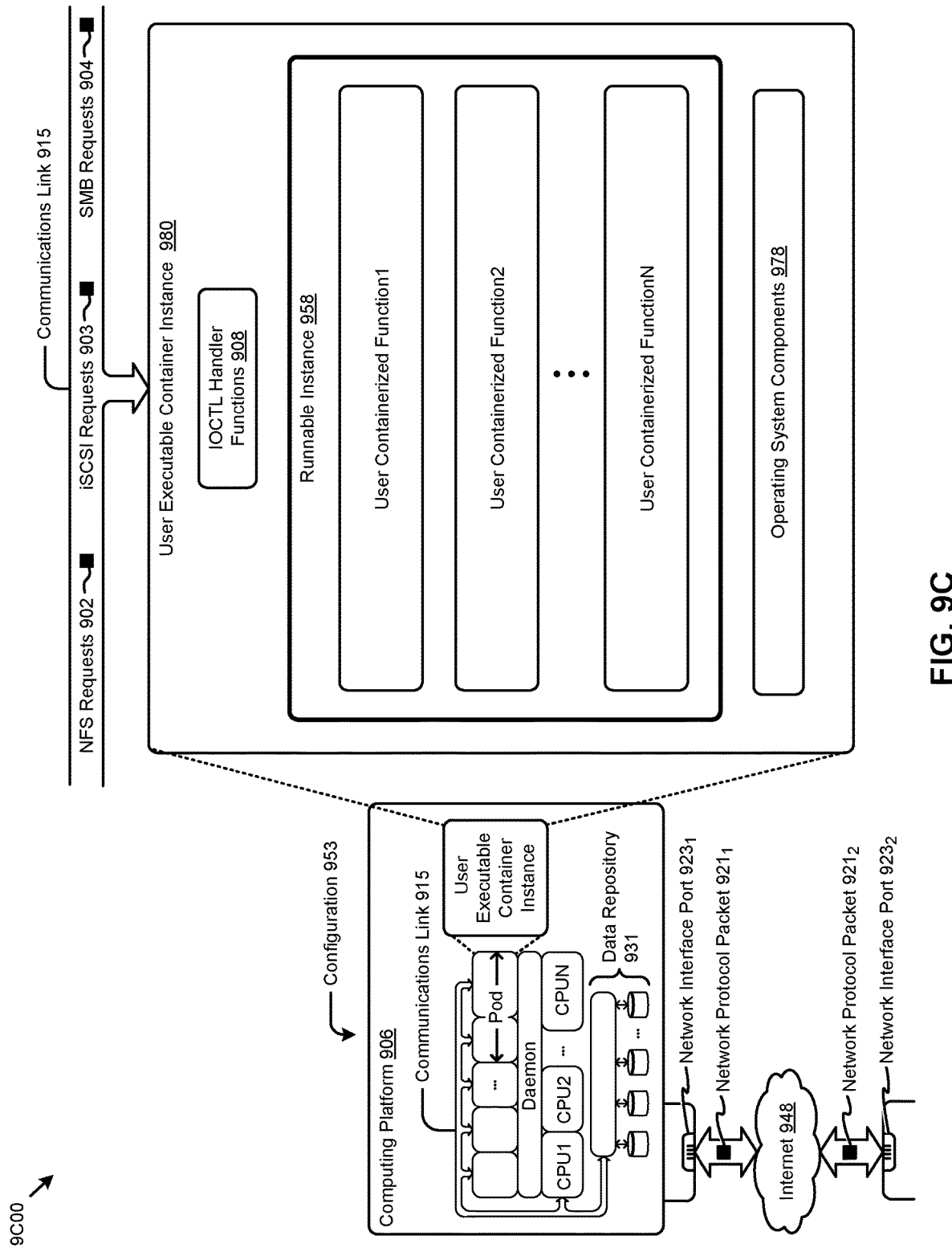

FIG. 9C depicts a virtualized controller implemented by a daemon-assisted containerized architecture 9C00. The containerized architecture comprises a collection of interconnected components suitable for implementing embodiments of the present disclosure and/or for use in the herein-described environments. Moreover, the shown daemon-assisted containerized architecture includes a user executable container instance in configuration 953 that is further described as pertaining to user executable container instance 980. Configuration 953 includes a daemon layer (as shown) that performs certain functions of an operating system.

User executable container instance 980 comprises any number of user containerized functions (e.g., user containerized function1, user containerized function2, . . . , user containerized functionN). Such user containerized functions can execute autonomously, or can be interfaced with or wrapped in a runnable object to create a runnable instance (e.g., runnable instance 958). In some cases, the shown operating system components 978 comprise portions of an operating system, which portions are interfaced with or included in the runnable instance and/or any user containerized functions. In this embodiment of a daemon-assisted containerized architecture, the computing platform 906 might or might not host operating system components other than operating system components 978. More specifically, the shown daemon might or might not host operating system components other than operating system components 978 of user executable container instance 980.

The virtual machine architecture 9A00 of FIG. 9A and/or the containerized architecture 9B00 of FIG. 9B and/or the daemon-assisted containerized architecture 9C00 of FIG. 9C can be used in any combination to implement a distributed platform that contains multiple servers and/or nodes that manage multiple tiers of storage, where the tiers of storage might be formed using the external data repository 931 and/or any forms of network accessible storage. As such, the multiple tiers of storage may include storage that is accessible over the communications link 915. Such network accessible storage may include cloud storage or networked storage (e.g., a SAN or "storage area network"). Unlike prior approaches, the presently-discussed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices, such as SSDs or RAPMs, or hybrid HDDs or other types of high-performance storage devices.

In example embodiments, each storage controller exports one or more block devices or NFS or iSCSI targets that appear as disks to user virtual machines or user executable containers. These disks are virtual, since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

Any one or more of the aforementioned virtual disks (or "vDisks") can be structured from any one or more of the storage devices in the storage pool. As used herein, the term vDisk refers to a storage abstraction that is exposed by a controller virtual machine or container to be used by another virtual machine or container. In some embodiments, the vDisk is exposed by operation of a storage protocol such as iSCSI or NFS or SMB. In some embodiments, a vDisk is mountable. In some embodiments, a vDisk is mounted as a virtual storage device.

In example embodiments, some or all of the servers or nodes run virtualization software. Such virtualization software might include a hypervisor (e.g., as shown in configuration 951 of FIG. 9A) to manage the interactions between the underlying hardware and user virtual machines or containers that run client software.

Distinct from user virtual machines or user executable containers, a special controller virtual machine (e.g., as depicted by controller virtual machine instance 930) or as a special controller executable container is used to manage certain storage and I/O activities. Such a special controller virtual machine is referred to as a "CVM", or as a controller executable container, or as a service virtual machine "SVM", or as a service executable container, or as a "storage controller". In some embodiments, multiple storage controllers are hosted by multiple nodes. Such storage controllers coordinate within a computing system to form a computing cluster. The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines—above the hypervisors—thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method comprising:
receiving, at a disaster recovery layer, a first replication operation and a second replication operation for a virtualized application, the first replication operation specifying replication of a first type of information and the second replication operation specifying replication of a second type of information different from the first type of information, and wherein the second replication operation specifies processing of data accessed by a virtualized entity for the virtualized application, and the first replication operation specifies processing of a state of the virtualized entity;
processing the first replication operation at the disaster recovery layer at least by applying a first target storage rule to determine a first cloud-based service provider of a plurality of cloud-based service providers, the first cloud-based service provider being selected to store the first type of information corresponding to the first replication operation;
processing the second replication operation at the disaster recovery layer at least by applying a second target storage rule to determine a second cloud-based service provider of the plurality of cloud-based service providers, the second cloud-based service provider being selected to store the second type of information corresponding to the second replication operation;
receiving, at the disaster recovery layer, a command to create a recovery point for the virtualized application; and
processing the command to create the recovery point by at least storing at the disaster recovery layer an association between the first type of information at the first cloud-based service provider and the second type of information at the second cloud-based service provider, wherein the first cloud-based service provider that stores the first type of information is different from the second cloud-based service provider that stores the second type of information.

2. The method of claim 1, wherein the command comprises a recovery point description of two or more virtualized computing resource entities, and the recovery point description comprises a hierarchical relationship between the two or more virtualized computing resource entities.

3. The method of claim 1, wherein the command comprises a recovery point description of two or more virtualized computing resource entities, and the two or more virtualized computing resource entities comprise at least one virtual machine of the virtualized application.

4. The method of claim 1, wherein the first and second cloud-based service providers comprise heterogeneous service providers, and the first or second cloud-based service provider is selected based on performance, security, cost, or availability.

5. The method of claim 1, further comprising processing a second command to create a second recovery point by at least storing at the disaster recovery layer a second association between the first type of information and the second type of information.

6. The method of claim 5, wherein the first type of information and the second type of information corresponding to the second command are to be stored at a single cloud-based service provider.

7. The method of claim 1, further comprising associating the second replication operation with two or more virtualized computing resource entities.

8. The method of claim 1, further comprising associating the second replication operation with two or more virtualized computing resource entities, wherein the two or more virtualized computing resource entities are associated by at least one of, a parent-child relationship, the virtualized application, a time, or a context.

9. A non-transitory computer readable medium having stored thereon a sequence of instructions which, when stored in memory and executed by a processor causes a set of acts, the set of acts comprising:
receiving, at a disaster recovery layer, a first replication operation and a second replication operation for a virtualized application, the first replication operation specifying replication of a first type of information and the second replication operation specifying replication of a second type of information different from the first type of information, and wherein the second replication operation specifies processing of data accessed by a virtualized entity for the virtualized application, and the first replication operation specifies processing of a state of the virtualized entity;
processing the first replication operation at the disaster recovery layer at least by applying a first target storage rule to determine a first cloud-based service provider of a plurality of cloud-based service providers, the first cloud-based service provider being selected to store the first type of information corresponding to the first replication operation;
processing the second replication operation at the disaster recovery layer at least by applying a second target storage rule to determine a second cloud-based service provider of the plurality of cloud-based service providers, the second cloud-based service provider being selected to store the second type of information corresponding to the second replication operation;
receiving, at the disaster recovery layer, a command to create a recovery point for the virtualized application; and
processing the command to create the recovery point by at least storing at the disaster recovery layer an association between the first type of information at the first cloud-based service provider and the second type of information at the second cloud-based service provider, wherein the first cloud-based service provider that stores the first type of information is different from the second cloud-based service provider that stores the second type of information.

10. The non-transitory computer readable medium of claim 9, wherein the set of acts further comprise associating the second replication operation with two or more virtualized computing resource entities.

11. The non-transitory computer readable medium of claim 9, wherein the set of acts further comprise associating the second replication operation with two or more virtualized computing resource entities, wherein the two or more virtualized computing resource entities are associated by at least one of, a parent-child relationship, the virtualized application, a time, or a context.

12. The non-transitory computer readable medium of claim 9, wherein the command comprises a recovery point description of two or more virtualized computing resource entities, and the recovery point description comprises a hierarchical relationship between the two or more virtualized computing resource entities.

13. The non-transitory computer readable medium of claim 9, wherein the command comprises a recovery point description of two or more virtualized computing resource entities, and the two or more virtualized computing resource entities comprise at least one virtual machine of the virtualized application.

14. The non-transitory computer readable medium of claim 9, wherein the first and second cloud-based service providers comprise heterogeneous service providers, and the first or second cloud-based service provider is selected based on performance, security, cost, or availability.

15. The non-transitory computer readable medium of claim 9, wherein the set of acts further comprise processing a second command to create a second recovery point by at least storing at the disaster recovery layer a second association between the first type of information and the second type of information.

16. The non-transitory computer readable medium of claim 15, wherein the first type of information and the second type of information corresponding to the second command are to be stored at a single cloud-based service provider.

17. A system comprising:
a storage medium having stored thereon a set of instructions; and
a processor that executes the set of instructions to cause a set of acts, the set of acts comprising:
receiving, at a disaster recovery layer, a first replication operation and a second replication operation for a virtualized application, the first replication operation specifying replication of a first type of information and the second replication operation specifying replication of a second type of information different from the first type of information, and wherein the second replication operation specifies processing of data accessed by a virtualized entity for the virtualized application, and the first replication operation specifies processing of a state of the virtualized entity;
processing the first replication operation at the disaster recovery layer at least by applying a first target storage rule to determine a first cloud-based service provider of a plurality of cloud-based service providers, the first cloud-based service provider being selected to store the first type of information corresponding to the first replication operation;
processing the second replication operation at the disaster recovery layer at least by applying a second target storage rule to determine a second cloud-based service provider of the plurality of cloud-based service providers, the second cloud-based service provider being selected to store the second type of information corresponding to the second replication operation;
receiving, at the disaster recovery layer, a command to create a recovery point for the virtualized application; and
processing the command to create the recovery point by at least storing at the disaster recovery layer an association between the first type of information at the first cloud-based service provider and the second type of information at the second cloud-based service provider, wherein the first cloud-based service provider that stores the first type of information is different from the second cloud-based service provider that stores the second type of information.

18. The system of claim 17, wherein the set of acts further comprise associating the second replication operation with two or more virtualized computing resource entities, wherein the two or more virtualized computing resource entities are associated by at least one of, a parent-child relationship, the virtualized application, a time, or a context.

19. The system of claim 17, wherein the command comprises a recovery point description of two or more virtualized computing resource entities, and the recovery point description comprises a hierarchical relationship between the two or more virtualized computing resource entities.

20. The system of claim 17, wherein the command comprises a recovery point description of two or more virtualized computing resource entities, and the two or more virtualized computing resource entities comprise at least one virtual machine of the virtualized application.

21. The system of claim 17, wherein the first and second cloud-based service providers comprise heterogeneous service providers, and the first or second cloud-based service provider is selected based on performance, security, cost, or availability.

22. The system of claim 17, wherein the set of acts further comprise processing a second command to create a second recovery point by at least storing at the disaster recovery layer a second association between the first type of information and the second type of information.

23. The system of claim 22, wherein the first type of information and the second type of information corresponding to the second command are to be stored at a single cloud-based service provider.

24. The system of claim 17, wherein the set of acts further comprise associating the second replication operation with two or more virtualized computing resource entities.

* * * * *